United States Patent
Wang et al.

(10) Patent No.: US 12,309,055 B2
(45) Date of Patent: May 20, 2025

(54) ROUTE DETERMINING METHOD AND APPARATUS AND NETWORK DEVICE

(71) Applicant: Huawei Technologies Co., Ltd., Shenzhen (CN)

(72) Inventors: Haibo Wang, Beijing (CN); Shunwan Zhuang, Beijing (CN); Cheng Sheng, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 299 days.

(21) Appl. No.: 17/942,827

(22) Filed: Sep. 12, 2022

(65) Prior Publication Data

US 2023/0006917 A1 Jan. 5, 2023

Related U.S. Application Data

(63) Continuation of application No. PCT/CN2021/078532, filed on Mar. 1, 2021.

(30) Foreign Application Priority Data

Mar. 13, 2020 (CN) .......................... 202010177892.8

(51) Int. Cl.
*H04L 45/00* (2022.01)
*H04L 47/28* (2022.01)
*H04L 49/00* (2022.01)

(52) U.S. Cl.
CPC .............. *H04L 45/20* (2013.01); *H04L 47/28* (2013.01); *H04L 49/00* (2013.01)

(58) Field of Classification Search
None
See application file for complete search history.

(56) References Cited

U.S. PATENT DOCUMENTS

| | | | |
|---|---|---|---|
| 7,565,694 | B2 | 7/2009 | Appanna et al. |
| 9,900,242 | B2 | 2/2018 | Xu et al. |
| 9,912,577 | B2 | 3/2018 | Filsfils et al. |
| 9,967,184 | B2 | 5/2018 | Tantsura et al. |
| 10,142,239 | B2 | 11/2018 | Nagarajan et al. |
| 10,454,821 | B2 | 10/2019 | Filsfils et al. |
| 11,444,874 | B2 | 9/2022 | Ren et al. |

(Continued)

FOREIGN PATENT DOCUMENTS

| | | | |
|---|---|---|---|
| CN | 101052207 A | | 10/2007 |
| CN | 101090355 A | | 12/2007 |

(Continued)

*Primary Examiner* — Xavier S Wong
(74) *Attorney, Agent, or Firm* — SLATER MATSIL, LLP

(57) ABSTRACT

A route determining method, apparatus, and a network device are disclosed. The method includes a first forwarding node receives routing information from a second forwarding node, and then sends a packet to a destination node based on the routing information. The routing information includes a node identifier of the destination node and at least one piece of indication information that is in a one-to-one correspondence with at least one third forwarding node, and the second forwarding node belongs to the at least one third forwarding node. The packet includes the at least one piece of indication information, and the at least one piece of indication information indicates to forward the packet along the at least one third forwarding node.

19 Claims, 24 Drawing Sheets

(56) References Cited

U.S. PATENT DOCUMENTS

| | | | |
|---|---|---|---|
| 2006/0075482 A1 | 4/2006 | Appanna et al. | |
| 2013/0322258 A1 | 12/2013 | Nedeltchev et al. | |
| 2015/0304206 A1 | 10/2015 | Filstils et al. | |
| 2017/0005922 A1 | 1/2017 | Tantsura et al. | |
| 2017/0150418 A1 | 5/2017 | Kim et al. | |
| 2018/0034665 A1* | 2/2018 | Nguyen | H04W 8/005 |
| 2018/0109444 A1* | 4/2018 | Sajassi | H04L 45/28 |
| 2018/0109450 A1* | 4/2018 | Filsfils | H04L 45/04 |
| 2018/0234338 A1 | 8/2018 | Tantsura et al. | |
| 2018/0248803 A1 | 8/2018 | Nagarajan et al. | |
| 2018/0375763 A1 | 12/2018 | Brissette et al. | |
| 2019/0288941 A1* | 9/2019 | Filsfils | H04L 69/22 |

FOREIGN PATENT DOCUMENTS

| | | | |
|---|---|---|---|
| CN | 102217378 | A | 10/2011 |
| CN | 103036786 | A | 4/2013 |
| CN | 103368806 | A | 10/2013 |
| CN | 105577543 | A | 5/2016 |
| CN | 107342939 | A | 11/2017 |
| CN | 107509226 | A | 12/2017 |
| CN | 108234317 | A | 6/2018 |
| CN | 109962850 | A | 7/2019 |
| CN | 110535812 | A | 12/2019 |

\* cited by examiner

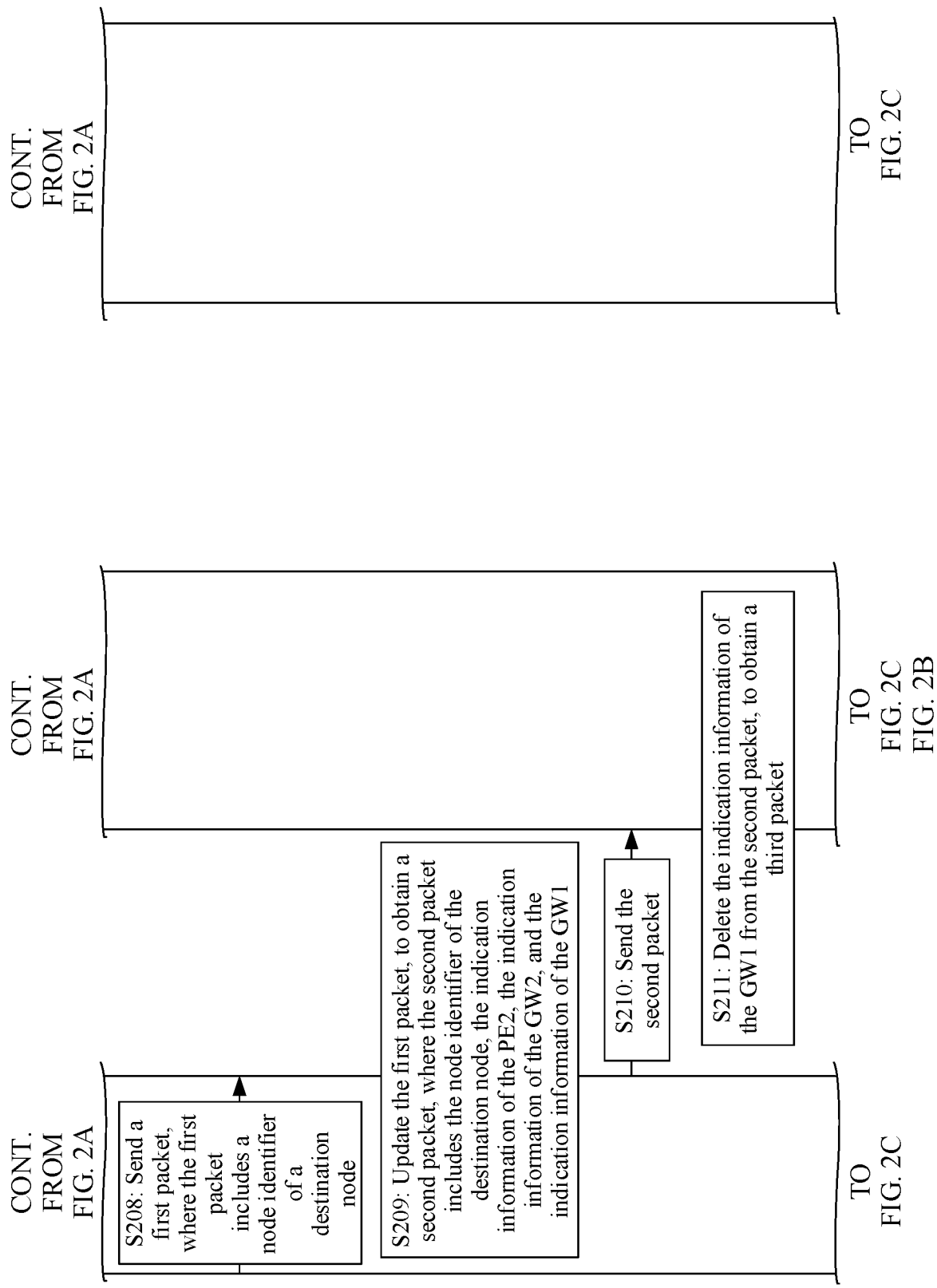

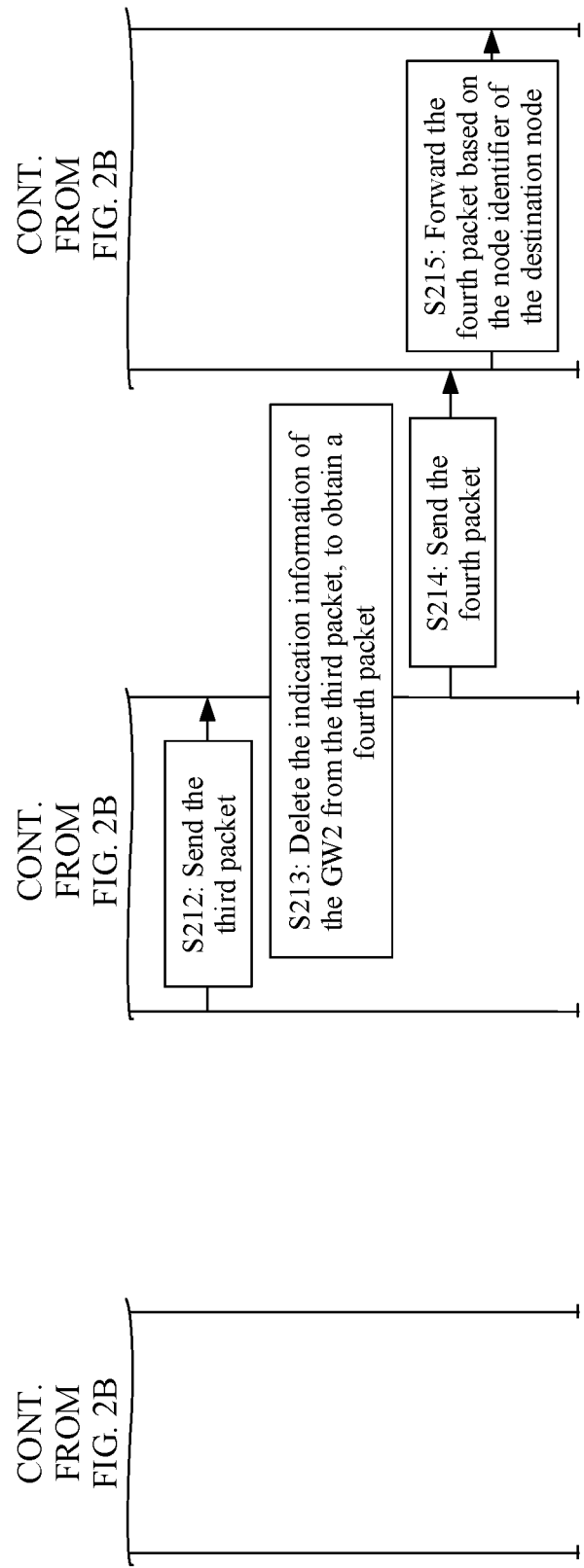

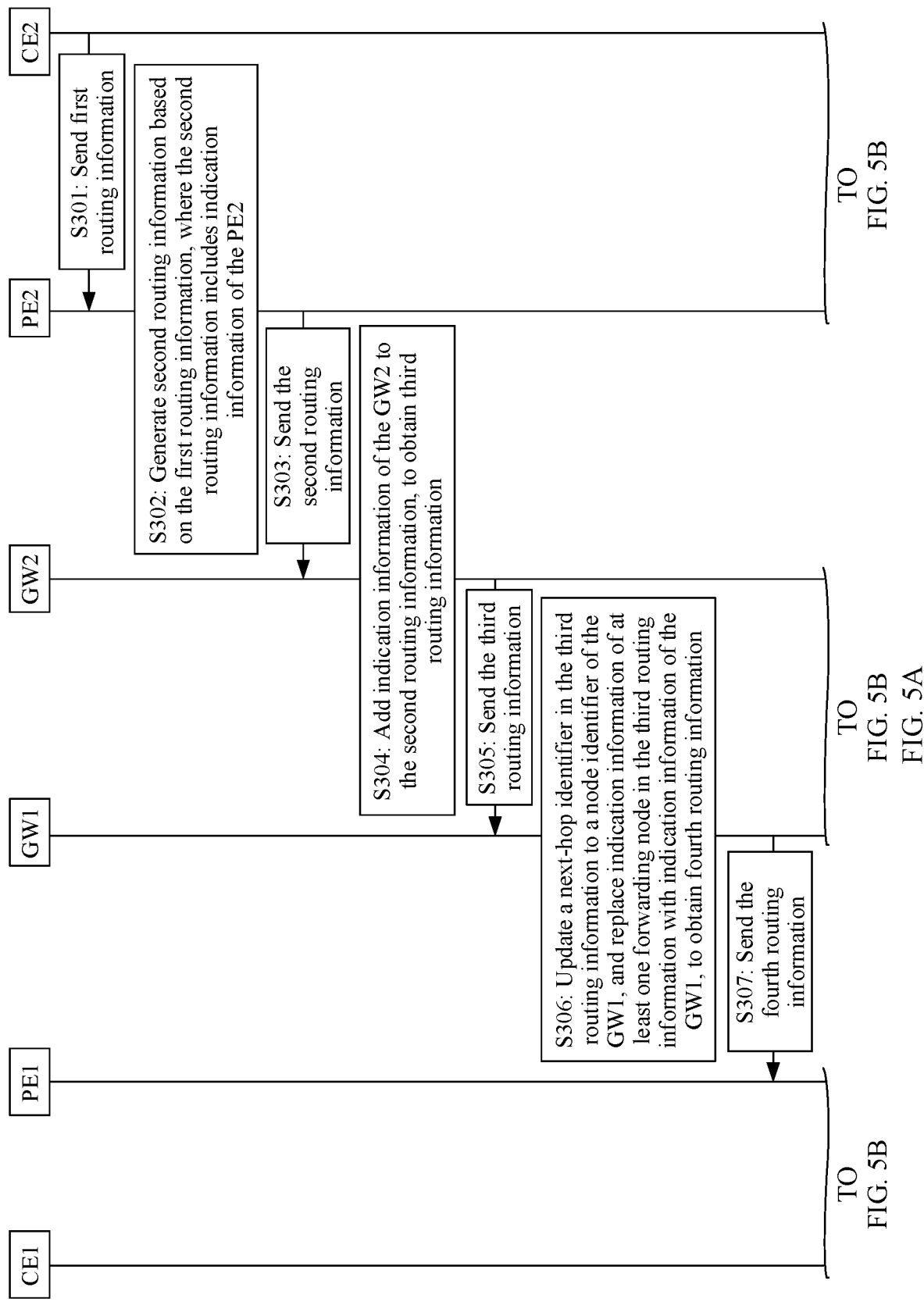

ROUTE DETERMINING METHOD AND APPARATUS AND NETWORK DEVICE

CROSS-REFERENCE TO RELATED APPLICATIONS

This application is a continuation of International Application No. PCT/CN2021/078532, filed on Mar. 1, 2021, which claims priority to Chinese Patent Application No. 202010177892.8, filed on Mar. 13, 2020. The disclosures of the aforementioned applications are hereby incorporated by reference in their entireties.

TECHNICAL FIELD

This application relates to the field of communication technologies, and in particular, to a route determining method and apparatus and a network device.

BACKGROUND

A data transmission system usually includes a source node, a destination node, and a plurality of forwarding nodes, and the source node may transmit a packet to the destination node through the plurality of forwarding nodes.

To transmit the packet from the source node to the destination node, the source node and a forwarding node used as a next hop of the source node need to learn of a corresponding route. Currently, in a case of cross-domain packet transmission, a connection is usually established between the forwarding nodes, and each forwarding node may transmit, for example, a border gateway protocol labeled unicast packet through the established connection, to establish a packet transmission path or tunnel. Alternatively, the forwarding node determines at least one transmission path or tunnel based on control packets received from a controller. When forwarding the packet sent by the source node to the destination node, the forwarding node connected to the source node needs to determine a transmission path based on information about the destination node, or select, from the determined at least one tunnel based on a next-hop identifier carried in learned routing information of the destination node, a tunnel that reaches a forwarding node indicated by the next-hop identifier. Then, the forwarding node needs to forward the packet to the forwarding node through the transmission path or tunnel, so that the forwarding node sends the packet to the destination node after receiving the packet.

However, before forwarding the packet, the forwarding node needs to determine a forwarding path of the packet by obtaining or transmitting dedicated control packets. In addition, overall network load is high due to a large quantity of control packets.

SUMMARY

This application provides a route determining method and apparatus and a network device, to resolve a problem that a process in which a forwarding node determines a tunnel before forwarding a packet is complex. The technical solutions are as follows:

According to a first aspect, a route determining method is provided. The method includes: A first forwarding node receives routing information sent by a second forwarding node, and then sends a packet to a destination node based on the routing information. The routing information includes a node identifier of the destination node and at least one piece of indication information, the at least one piece of indication information is in a one-to-one correspondence with at least one third forwarding node, and the second forwarding node belongs to the at least one third forwarding node. A packet sent by the first forwarding node includes the at least one piece of indication information, and the at least one piece of indication information indicates to forward the packet along the at least one third forwarding node.

Because an issued route corresponding to the destination node carries indication information of a forwarding node, after receiving the routing information, a forwarding node connected to a source node may determine, based on the indication information of the forwarding node in the routing information, a route and a transmission path for sending a packet to the destination node, to forward the packet to the destination node based on the route and the transmission path. In this process, the indication information of the forwarding node is determined by the forwarding node and is added during route issuing. This avoids that the forwarding node connected to the source node determines the transmission path by transmitting a large quantity of control packets. Therefore, network load is reduced.

Optionally, that the first forwarding node sends the packet to the destination node based on the routing information includes: The first forwarding node establishes a correspondence between the node identifier of the destination node and first tunnel information based on the routing information, and then sends the packet to the destination node based on the first tunnel information. The first tunnel information includes the at least one piece of indication information. In another case, the first forwarding node may alternatively not generate the tunnel information based on the routing information, but directly establish a local forwarding entry based on the received routing information. In this way, when the first forwarding node sends the packet to the destination node based on the routing information, the first forwarding node directly sends the packet to the destination node based on the at least one piece of indication information in the routing information.

Optionally, the at least one piece of indication information includes a segment identifier of the at least one third forwarding node, and the segment identifier of the at least one third forwarding node is sequentially arranged based on a routing distance between the at least one third forwarding node and the first forwarding node. For example, SIDs of the forwarding nodes in the routing information may be arranged in descending order or ascending order of routing distances between these forwarding nodes and a PE1. A routing distance between two nodes may be represented by a quantity of nodes through which the packet transmitted between the two nodes needs to pass. A large quantity of nodes through which the packet transmitted between the two nodes needs to pass indicates a large routing distance between the two nodes; or a small quantity of nodes through which the packet transmitted between the two nodes needs to pass indicates a small routing distance between the two nodes. By introducing the segment identifier, each corresponding forwarding node may be clearly indicated, and protocol compatibility of this method is improved. In another possible case, with reference to a specific network application scenario, another type of information may alternatively be selected to indicate or identify the forwarding node.

Optionally, the at least one piece of indication information further includes endpoint information of the at least one third forwarding node. The endpoint of the forwarding node may identify the forwarding node corresponding to the SID, and may be used to quickly determine the forwarding node corresponding to the SID, to facilitate verification, quick positioning, and node maintenance. Therefore, when the indication information of the forwarding node includes the endpoint, the corresponding forwarding node may be quickly determined based on the indication information of the forwarding node, so that maintenance of the forwarding node is facilitated. The endpoint may be information such as a loopback address.

Optionally, the at least one third forwarding node includes a fourth forwarding node, the fourth forwarding node is a node that is in the at least one third forwarding node and that has a largest routing distance from the first forwarding node, the routing information further includes a next-hop identifier, and the next-hop identifier includes a node identifier of the fourth forwarding node. Because the next-hop identifier in the routing information is the node identifier of the fourth forwarding node, when forwarding the packet to the destination node based on the routing information, the first forwarding node may first forward the packet to the fourth forwarding node, so that the fourth forwarding node forwards the packet to the destination node. The next-hop identifier included in the routing information may be used for packet forwarding, tunnel iteration, or the like.

Optionally, that the first forwarding node sends the packet to the destination node based on the first tunnel information includes: The first forwarding node obtains, based on the node identifier of the destination node, a plurality of pieces of tunnel information corresponding to the node identifier of the destination node, where the plurality of pieces of tunnel information correspond to a plurality of tunnels, and the plurality of pieces of tunnel information include the first tunnel information. Then, the first forwarding node may determine the first tunnel information from the plurality of pieces of tunnel information based on a tunnel constraint (for example, a transmission delay condition or a bandwidth condition), and send the packet to the destination node based on the determined first tunnel information. When there are a plurality of optional tunnels, an available tunnel is selected with reference to the tunnel constraint, so that robustness and usability of network transmission can be improved.

Optionally, the at least one third forwarding node includes a fourth forwarding node, and the fourth forwarding node is a node that is in the at least one third forwarding node and that has a largest routing distance from the first forwarding node. The at least one piece of indication information in the routing information received by the first forwarding node includes first indication information, the first indication information indicates the fourth forwarding node, and a segment identifier type of the first indication information is a binding segment identifier. When the segment identifier type of the first indication information is the binding segment identifier, it indicates that the fourth forwarding node changes the next-hop identifier in the routing information when forwarding the routing information. Certainly, when the fourth forwarding node changes the next-hop identifier, the segment identifier type of the first indication information may alternatively not be the binding segment identifier, but may be another proper identifier type. In this optional solution, one or more forwarding nodes on the transmission path are allowed to modify next-hop information, so that flexibility of using the solution is improved. For example, in a scenario in which a large quantity of forwarding nodes are included on the transmission path, by using the solution of modifying a next hop, a length of routing information transmitted in a network can be properly reduced, so that network transmission resources are saved.

According to a second aspect, a route determining method is provided. The method includes: After obtaining routing information, a second forwarding node adds first indication information to the routing information, to obtain updated routing information, and sends the updated routing information to a first forwarding node. The routing information includes a node identifier of a destination node and at least one piece of indication information, the at least one piece of indication information indicates at least one third forwarding node, and the first indication information indicates the second forwarding node. The second forwarding node may obtain the routing information locally (for example, a case in which an address of the destination node included in an issued route is a locally stored loopback address), or may receive the routing information from another network device.

In the route determining method provided in this embodiment of this application, the second forwarding node adds the first indication information to the routing information, and issues the updated routing information. Therefore, after receiving the routing information, the forwarding node connected to a source node may determine, based on the indication information of the forwarding node in the routing information, a route and a transmission path for sending a packet to the destination node, to forward the packet to the destination node based on the route and the transmission path. This process avoids that the forwarding node connected to the source node determines the transmission path by frequently transmitting control packets. Therefore, a quantity of control packets transmitted in a network is reduced, and network load is reduced.

Optionally, the routing information obtained by the second forwarding node further includes a next-hop identifier.

The second forwarding node may not change the next-hop identifier in the obtained routing information. In this case, the updated routing information includes the first indication information and the at least one piece of indication information.

Alternatively, the second forwarding node may change the next-hop identifier in the obtained routing information. In this case, that a second forwarding node adds first indication information to the routing information, to obtain updated routing information includes: The second forwarding node updates the next-hop identifier to a node identifier of the second forwarding node, replaces the at least one piece of indication information with the first indication information, to add the first indication information to the routing information, to obtain the updated routing information. The updated routing information includes the node identifier of the second forwarding node and the first indication information. In this case, the second forwarding node may store a correspondence between the first indication information (namely, the node identifier of the second forwarding node) and the at least one piece of indication information, to facilitate subsequent successful forwarding of the packet.

Optionally, when the second forwarding node does not change the next-hop identifier in the obtained routing information, after that the second forwarding node sends the updated routing information, the method further includes: The second forwarding node receives a packet sent to the destination node, and sends an updated packet to a fourth forwarding node. The packet received by the second forwarding node includes the first indication information and the at least one piece of indication information; and the updated packet includes the at least one piece of indication information but does not include the first indication information, and the fourth forwarding node belongs to the at least one third forwarding node. It can be learned that when the second forwarding node does not change the next-hop identifier in the received routing information, after receiving the packet, the second forwarding node deletes or replaces the indication information of the second forwarding node in the packet, to obtain the updated packet. The deletion or replacement manner may be, for example, a specific operation form such as popping the indication information from a stack or updating a packet header including the indication information.

Optionally, when the second forwarding node changes the next-hop identifier in the obtained routing information, after that the second forwarding node sends the updated routing information, the method further includes: The second forwarding node receives a packet sent to the destination node, and sends an updated packet to a fourth forwarding node. The packet received by the second forwarding node includes the first indication information; and the updated packet includes the at least one piece of indication information but does not include the first indication information, and the fourth forwarding node belongs to the at least one third forwarding node. It can be learned that when the second forwarding node changes the next-hop identifier in the received routing information, after receiving the packet, the second forwarding node replaces the indication information in the packet, to be specific, replaces the first indication information with the at least one piece of indication information based on the previously stored correspondence between the first indication information and the at least one piece of indication information, to implement subsequent successful forwarding of the packet.

Optionally, that the second forwarding node sends the updated packet to the fourth forwarding node includes: The second forwarding node removes the first indication information from the packet, adds the at least one piece of indication information to the packet based on the correspondence between the first indication information and the at least one piece of indication information, and then sends the updated packet to the fourth forwarding node.

Optionally, the at least one piece of indication information includes a segment identifier of the at least one third forwarding node, the segment identifier of the at least one third forwarding node is sequentially arranged based on a routing distance between the at least one third forwarding node and the first forwarding node, and the first forwarding node is the $1^{st}$ forwarding node that forwards the packet to the destination node. For example, SIDs of the forwarding nodes in the routing information may be arranged in descending order or ascending order of routing distances between these forwarding nodes and a PE1. A routing distance between two nodes may be represented by a quantity of nodes through which the packet transmitted between the two nodes needs to pass. A large quantity of nodes through which the packet transmitted between the two nodes needs to pass indicates a large routing distance between the two nodes; or a small quantity of nodes through which the packet transmitted between the two nodes needs to pass indicates a small routing distance between the two nodes.

Optionally, the at least one piece of indication information further includes endpoint information of the at least one third forwarding node. The endpoint of the forwarding node may be used to quickly determine the forwarding node corresponding to the SID, to facilitate subsequent maintenance of the forwarding node. The endpoint may be information such as a loopback address.

Optionally, when the second forwarding node changes the next-hop identifier in the received routing information, the first indication information includes a binding segment identifier of the second forwarding node. When the second forwarding node changes the next-hop identifier in the received routing information, the first indication information may alternatively not include the binding segment identifier of the second forwarding node.

According to a third aspect, a route determining method is provided. The method includes: After obtaining first routing information of a destination node, a forwarding node generates second routing information based on the first routing information, and sends the second routing information. The second routing information includes a node identifier of the destination node, a next-hop identifier, and indication information, the indication information indicates the forwarding node, and the next-hop identifier is a node identifier of the forwarding node.

In the route determining method provided in this embodiment of this application, the second routing information generated by the forwarding node includes indication information of the forwarding node. Therefore, after receiving the routing information, the forwarding node connected to a source node may determine, based on the indication information of the forwarding node in the routing information, a route and a transmission path for sending a packet to the destination node, to forward the packet to the destination node based on the route and the transmission path. In this process, the indication information used to determine the transmission path is directly added by each forwarding node to the issued route. This avoids that the forwarding node connected to the source node determines the transmission path by receiving control packets. Therefore, the control packets transmitted in a network are reduced, and network load is reduced.

Optionally, the indication information of the forwarding node includes a segment identifier of the forwarding node. Optionally, the at least one piece of indication information further includes endpoint information of the at least one third forwarding node. This is not limited in this application.

Optionally, after that the forwarding node sends the second routing information, the method further includes: The forwarding node receives a packet, and forwards the packet to the destination node based on the node identifier of the destination node, or stores the packet in the destination node based on the node identifier of the destination node. The packet received by the forwarding node includes the node identifier of the destination node and the indication information.

According to a fourth aspect, a route determining apparatus is provided. The route determining apparatus includes: a receiving module, configured to receive routing information sent by a second forwarding node, where the routing information includes a node identifier of a destination node and at least one piece of indication information, the at least one piece of indication information is in a one-to-one correspondence with at least one third forwarding node, and the second forwarding node belongs to the at least one third forwarding node; and a sending module, configured to send a packet to the destination node based on the routing information, where the packet includes the at least one piece of indication information, and the at least one piece of indication information indicates to forward the packet along the at least one third forwarding node.

Because the routing information of the destination node carries the indication information of the forwarding node, after receiving the routing information, the forwarding node connected to a source node may determine, based on the indication information of the forwarding node in the routing information, a route and a transmission path for sending a packet to the destination node, to forward the packet to the destination node based on the route and the transmission path. In this process, each piece of indication information is autonomously added by each forwarding node. This avoids that the forwarding node connected to the source node determines the transmission path by receiving control packets. Therefore, a quantity of control packets transmitted in a network is reduced, and network load is reduced.

Optionally, the sending module is configured to: establish a correspondence between the node identifier of the destination node and first tunnel information based on the routing information, where the first tunnel information includes the at least one piece of indication information; and send the packet to the destination node based on the first tunnel information. Certainly, the first forwarding node may alternatively not establish the correspondence based on the routing information, and correspondingly, does not obtain the first tunnel information. When sending the packet to the destination node based on the routing information, the first forwarding node may directly send the packet to the destination node based on the at least one piece of indication information in the routing information. This is not limited in this application.

Optionally, the at least one piece of indication information includes a segment identifier of the at least one third forwarding node, and the segment identifier of the at least one third forwarding node is sequentially arranged based on a routing distance between the at least one third forwarding node and the first forwarding node. For example, SIDs of the forwarding nodes in the routing information may be arranged in descending order or ascending order of routing distances between these forwarding nodes and a PE1. A routing distance between two nodes may be represented by a quantity of nodes through which the packet transmitted between the two nodes needs to pass. A large quantity of nodes through which the packet transmitted between the two nodes needs to pass indicates a large routing distance between the two nodes; or a small quantity of nodes through which the packet transmitted between the two nodes needs to pass indicates a small routing distance between the two nodes.

Optionally, the at least one piece of indication information further includes endpoint information of the at least one third forwarding node.

Optionally, the at least one third forwarding node includes a fourth forwarding node, the fourth forwarding node is a node that is in the at least one third forwarding node and that has a largest routing distance from the first forwarding node, the routing information further includes a next-hop identifier, and the next-hop identifier includes a node identifier of the fourth forwarding node. Because the next-hop identifier in the routing information is the node identifier of the fourth forwarding node, when forwarding the packet to the destination node based on the routing information, the first forwarding node may first forward the packet to the fourth forwarding node, so that the fourth forwarding node forwards the packet to the destination node.

Optionally, the sending module is configured to: obtain, based on the node identifier of the destination node, a plurality of pieces of tunnel information corresponding to the node identifier of the destination node, where the plurality of pieces of tunnel information correspond to a plurality of tunnels, and the plurality of pieces of tunnel information include the first tunnel information; determine the first tunnel information from the plurality of pieces of tunnel information based on a tunnel constraint (for example, a transmission delay condition or a bandwidth condition); and send the packet to the destination node based on the determined first tunnel information.

Optionally, the at least one third forwarding node includes a fourth forwarding node, the fourth forwarding node is a node that is in the at least one third forwarding node and that has a largest routing distance from the first forwarding node, the at least one piece of indication information includes first indication information, the first indication information indicates the fourth forwarding node, and a segment identifier type of the first indication information is a binding segment identifier. When the segment identifier type of the first indication information is the binding segment identifier, it indicates that the fourth forwarding node changes the next-hop identifier in the routing information when forwarding the routing information. When the fourth forwarding node changes the next-hop identifier, the segment identifier type of the first indication information may alternatively not be the binding segment identifier.

According to a fifth aspect, a route determining apparatus is provided. The route determining apparatus includes: a first obtaining module, configured to obtain routing information, where the routing information includes a node identifier of a destination node and at least one piece of indication information, and the at least one piece of indication information indicates at least one third forwarding node; a processing module, configured to add first indication information to the routing information, to obtain updated routing information, where the first indication information indicates a second forwarding node; and a first sending module, configured to send the updated routing information to a first forwarding node.

Optionally, the routing information obtained by the first obtaining module further includes a next-hop identifier.

The second forwarding node may not change the next-hop identifier in the obtained routing information. In this case, the updated routing information includes the first indication information and the at least one piece of indication information.

Alternatively, the second forwarding node may change the next-hop identifier in the obtained routing information. In this case, the processing module is configured to: update the next-hop identifier to a node identifier of the second forwarding node; and replace the at least one piece of indication information with the first indication information, to add the first indication information to the routing information, where the updated routing information includes the node identifier of the second forwarding node and the first indication information.

Optionally, when the second forwarding node does not change the next-hop identifier in the obtained routing information, the route determining apparatus further includes: a second receiving module, configured to receive a packet sent to the destination node, where the packet includes the first indication information and the at least one piece of indication information; and a second sending module, configured to send an updated packet to a fourth forwarding node, where the updated packet includes the at least one piece of indication information but does not include the first indication information, and the fourth forwarding node belongs to the at least one third forwarding node. It can be learned that when the second forwarding node does not change the next-hop identifier in the received routing information, after receiving the packet, the second forwarding node deletes or replaces the indication information of the second forwarding node in the packet, to obtain the updated packet.

Optionally, when the second forwarding node changes the next-hop identifier in the obtained routing information, the route determining apparatus further includes: a third receiving module, configured to receive a packet sent to the destination node, where the packet includes the first indication information; and a third sending module, configured to send an updated packet to a fourth forwarding node, where the updated packet includes the at least one piece of indication information but does not include the first indication information, and the fourth forwarding node belongs to the at least one third forwarding node. It can be learned that when the second forwarding node changes the next-hop identifier in the received routing information, after receiving the packet, the second forwarding node replaces the indication information in the packet.

Optionally, the third sending module is configured to: remove the first indication information from the packet, add the at least one piece of indication information to the packet based on a correspondence between the first indication information and the at least one piece of indication information, and send the updated packet to the fourth forwarding node.

Optionally, the at least one piece of indication information includes a segment identifier of the at least one third forwarding node, the segment identifier of the at least one third forwarding node is sequentially arranged based on a routing distance between the at least one third forwarding node and the first forwarding node, and the first forwarding node is the $1^{st}$ forwarding node that forwards the packet to the destination node. For example, SIDs of the forwarding nodes in the routing information may be arranged in descending order or ascending order of routing distances between these forwarding nodes and a PE1. A routing distance between two nodes may be represented by a quantity of nodes through which the packet transmitted between the two nodes needs to pass. A large quantity of nodes through which the packet transmitted between the two nodes needs to pass indicates a large routing distance between the two nodes; or a small quantity of nodes through which the packet transmitted between the two nodes needs to pass indicates a small routing distance between the two nodes.

Optionally, the at least one piece of indication information further includes endpoint information of the at least one third forwarding node. Optionally, when the second forwarding node changes the next-hop identifier in the received routing information, the first indication information includes a binding segment identifier of the second forwarding node. Certainly, when the second forwarding node changes the next-hop identifier in the received routing information, the first indication information may alternatively not include the binding segment identifier of the second forwarding node. This is not limited in this application.

According to a sixth aspect, a route determining apparatus is provided. The route determining apparatus includes: a first obtaining module, configured to obtain first routing information of a destination node; a first processing module, configured to generate second routing information based on the first routing information, where the second routing information includes a node identifier of the destination node, a next-hop identifier, and indication information, the indication information indicates a forwarding node, and the next-hop identifier is a node identifier of the forwarding node; and a first sending module, configured to send the second routing information.

Optionally, the indication information of the forwarding node includes a segment identifier of the forwarding node. Optionally, the at least one piece of indication information further includes endpoint information of the at least one third forwarding node.

Optionally, the route determining apparatus further includes: a second receiving module, configured to receive a packet, where the packet includes the node identifier of the destination node and the indication information; and a second processing module, configured to: forward the packet to the destination node based on the node identifier of the destination node, or store the packet in the destination node based on the node identifier of the destination node.

According to a seventh aspect, a network device is provided. The network device includes a processor and a memory. The memory stores a program, and the processor is configured to invoke the program stored in the memory, to enable the network device to perform the route determining method according to any design in the first aspect.

According to an eighth aspect, a network device is provided. The network device includes a processor and a memory. The memory stores a program, and the processor is configured to invoke the program stored in the memory, to enable the network device to perform the route determining method according to any design in the second aspect.

According to a ninth aspect, a network device is provided. The network device includes a processor and a memory. The memory stores a program, and the processor is configured to invoke the program stored in the memory, to enable the network device to perform the route determining method according to any design in the third aspect.

According to a tenth aspect, a network device is provided. The network device includes a processor. The processor is configured to be coupled to a memory, to invoke a computer program stored in the memory, to perform the route determining method according to any design in the first aspect.

According to an eleventh aspect, a network device is provided. The network device includes a processor. The processor is configured to be coupled to a memory, to invoke a computer program stored in the memory, to perform the route determining method according to any design in the second aspect.

According to a twelfth aspect, a network device is provided. The network device includes a processor. The processor is configured to be coupled to a memory, to invoke a computer program stored in the memory, to perform the route determining method according to any design in the third aspect.

According to a thirteenth aspect, a computer storage medium is provided. The storage medium stores a computer program, and the computer program is used to perform the route determining method according to any design in the first aspect.

According to a fourteenth aspect, a computer storage medium is provided. The storage medium stores a computer program, and the computer program is used to perform the route determining method according to any design in the second aspect.

According to a fifteenth aspect, a computer storage medium is provided. The storage medium stores a computer program, and the computer program is used to perform the route determining method according to any design in the third aspect.

According to a sixteenth aspect, a computer program product including instructions is provided. When the computer program product runs on a network device, the network device is enabled to perform the route determining method according to any design in the first aspect.

According to a seventeenth aspect, a computer program product including instructions is provided. When the computer program product runs on a network device, the network device is enabled to perform the route determining method according to any design in the second aspect.

According to an eighteenth aspect, a computer program product including instructions is provided. When the computer program product runs on a network device, the network device is enabled to perform the route determining method according to any design in the third aspect.

For technical effects brought by any design in the seventh aspect to the eighteenth aspect, refer to technical effects brought by the corresponding design manners in the first aspect to the third aspect. Details are not described herein again.

BRIEF DESCRIPTION OF THE DRAWINGS

FIG. 2A to FIG. 2C are a flowchart of a route determining method according to an embodiment of this application;

FIG. 5A and FIG. 5B are a flowchart of another route determining method according to an embodiment of this application;

DETAILED DESCRIPTION OF ILLUSTRATIVE EMBODIMENTS

To make principles and technical solutions of this application clearer, the following further describes implementations of this application in detail with reference to the accompanying drawings.

Figure 1:
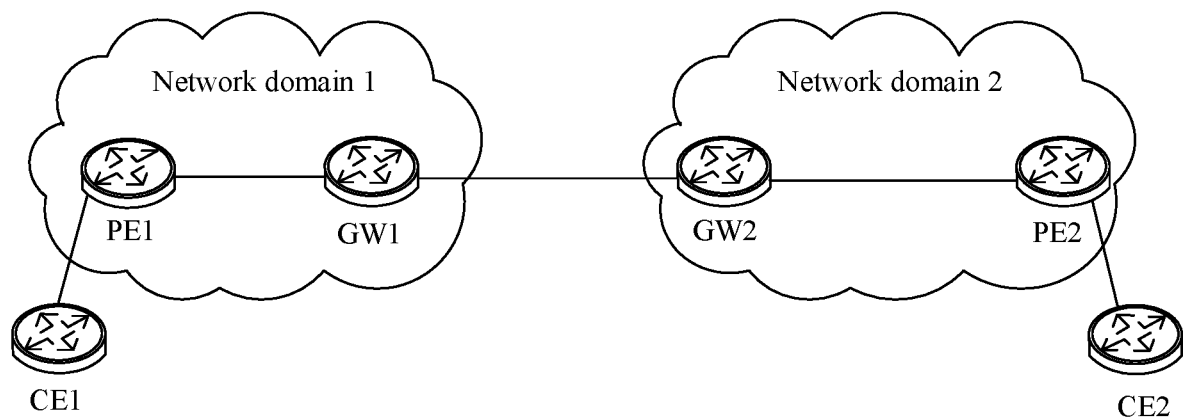
FIG. 1 is a schematic diagram of an application scenario of a route determining method according to an embodiment of this application.

FIG. 1 is a schematic diagram of an application scenario of a route determining method according to an embodiment of this application. The application scenario includes a plurality of nodes, and the plurality of nodes include a source node, a destination node, and a plurality of forwarding nodes. The source node and the destination node each may be connected to a part of the plurality of forwarding nodes, and a connection relationship exists between the plurality of forwarding nodes. Therefore, a packet transmission path from the source node to the destination node may be formed.

For example, FIG. 1 uses an example in which the source node is a customer edge (CE) node CE1, the destination node is a CE2, and the plurality of forwarding nodes include a provider edge (PE) node PE1, a PE2, and gateway (GW) nodes GW1 and GW2. FIG. 1 shows a network application scenario of cross-domain packet transmission. The CE1 is connected to the PE1, the CE2 is connected to the PE2, and the PE1, the GW1, the GW2, and the PE2 are sequentially connected.

The plurality of forwarding nodes may be located in one or more network domains. FIG. 1 uses an example in which the PE1 and the GW2 are located in a network domain 1, and the GW2 and the PE2 are located in a network domain 2.

It should be noted that the node in this embodiment of this application may be an independent network device, or may be a module having a forwarding function in a network device (in this case, the network device may include one or more nodes having a forwarding function). The network device may be a device such as a switch or a router.

The source node may forward a packet to the destination node through the plurality of forwarding nodes. Before forwarding the packet, the forwarding node needs to determine at least one tunnel based on an established connection relationship between the forwarding nodes. When forwarding the packet sent by the source node to the destination node, the forwarding node (for example, the PE1) connected to the source node (for example, the CE1) needs to determine, from the at least one tunnel based on a next-hop identifier in routing information issued by the destination node (for example, the CE2), a tunnel that reaches the forwarding node (for example, the PE2) indicated by the next-hop identifier. Then, the forwarding node connected to the source node needs to forward, through the tunnel, the packet to a forwarding node used as a next hop, so that the forwarding node used as the next hop sends the packet to the destination node after receiving the packet.

A tunnel established between the PE1 and the PE2 shown in FIG. 1 is used as an example. A conventional manner of establishing the tunnel between the PE1 and the PE2 may be, for example, establishment according to a border gateway protocol labeled unicast (BGP-LU) protocol. In this manner, when the PE2 issues a route of the CE2 to the PE1, the PE2 is set as a next hop of the route of the CE2, and the GW1 and the GW2 do not change next hops when receiving the route. In this case, after receiving the route of the CE2, the PE1 searches, based on information PE2 about the next hop in the route, for a tunnel whose destination address is the PE2, so that the tunnel between the PE1 and the PE2 is established. Alternatively, for example, a tunnel whose destination address is the PE1 may be determined for the PE1 through global calculation of a network controller, and delivered to the PE1.

However, a process in which the forwarding node determines the tunnel in the foregoing conventional manner before forwarding the packet is complex, and a large quantity of control protocol packets need to be transmitted for determining the tunnel, resulting in high overall network load.

Embodiments of this application provide a route determining method. In the route determining method, a route message carries indication information of at least one forwarding node, so that a forwarding tunnel can be quickly established. In addition, because a manner of determining the tunnel by transmitting control packets is avoided, complexity of implementing tunnel establishment is reduced, and load of resources on an entire network is reduced.

Figure 2A:
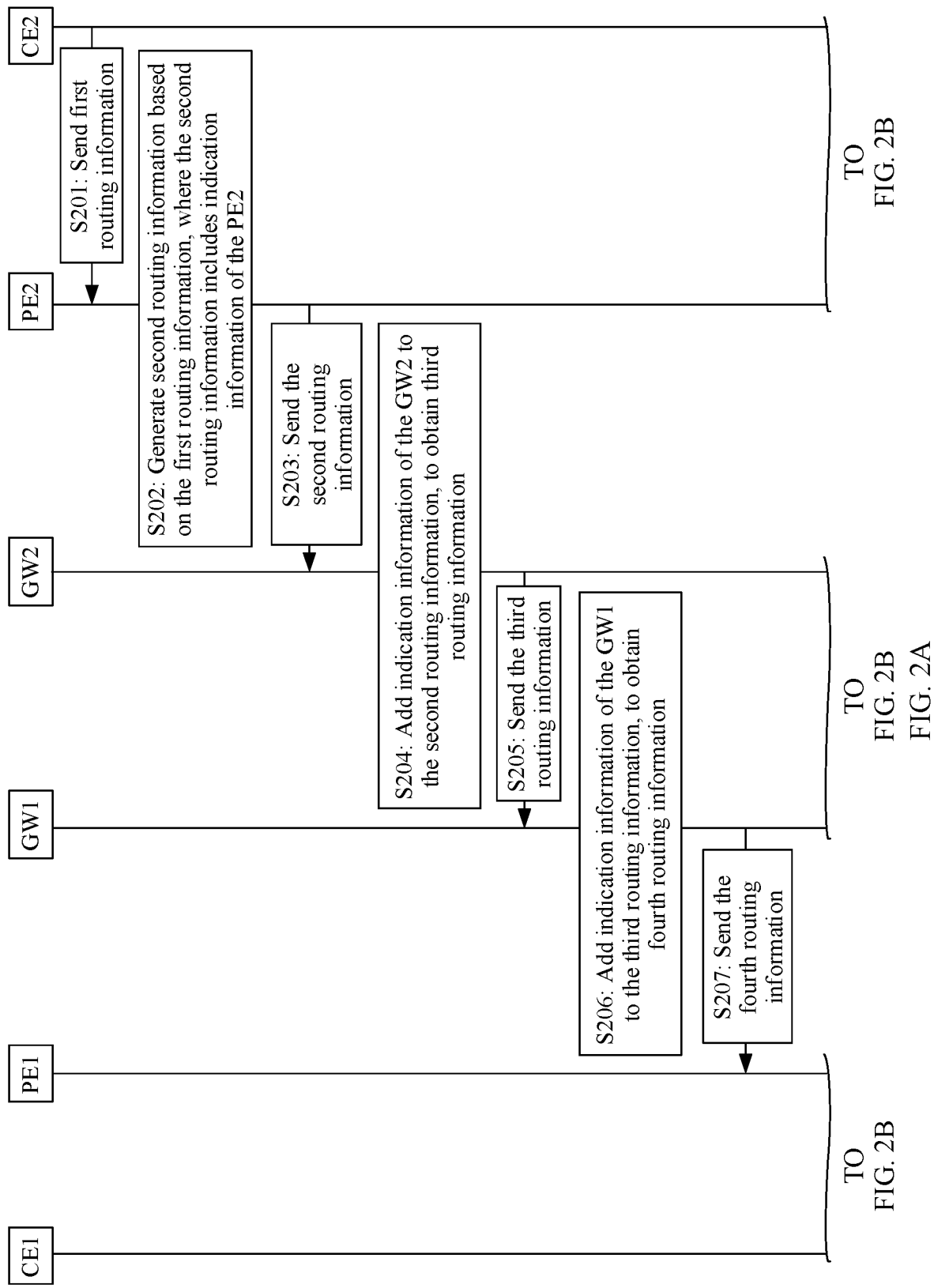

For example, FIG. 2A to FIG. 2C are a flowchart of a route determining method according to an embodiment of this application. In addition, the application scenario shown in FIG. 1 is used as an example in the route determining method. As shown in FIG. 2A to FIG. 2C, the route determining method includes the following steps.

S201: A CE2 sends first routing information to a PE2.

The first routing information is private network routing information issued by the CE2, so that a network device receiving the routing information learns of a route of the CE2. The private network routing information carries a node identifier of a destination node. After learning of the route, another network device may send a packet to the destination node based on the route. The node identifier of the destination node may be carried in a source address field of the route or another specified field. The node identifier of the destination node may be, for example, a route prefix set by the CE2. For example, the CE2 is connected to a plurality of user hosts, and the route prefix carried in the first routing information may be a network segment address covering some or all of the plurality of user hosts. The node identifier of the destination node may alternatively be an internet protocol (IP) address corresponding to a specific network device, or the like, and the specific network device may be, for example, the CE2, user equipment connected to the CE2, or another router connected to the CE2. An example in which the CE2 issues the first routing information to the PE2 is used in S201. In this case, the CE2 is a node in a virtual private network (VPN) instance managed by the PE2. In another possible case, the first routing information obtained by the PE2 may not be from the CE2, but may be routing information issued by the PE2 based on a locally configured loopback address in a VPN instance, or the like. In this case, the loopback address is the node identifier of the destination node. A manner of obtaining the first routing information is not uniquely limited in this embodiment of this application.

S202: The PE2 generates second routing information based on the first routing information, where the second routing information includes indication information of the PE2.

After obtaining the first routing information, the PE2 may generate the second routing information based on the first routing information. The first routing information may be obtained from another network device (for example, the CE2), or may be locally obtained (for example, based on a locally stored loopback address), or may be obtained through manual configuration. After being generated, the second routing information may be, for example, issued in a unicast mode according to border gateway protocol (BGP) internet protocol version 4 (Ipv4), or may be issued according to virtual private network version 4 (VPNv4), or an Ethernet virtual private network (EVPN) address family protocol.

Figure 3:
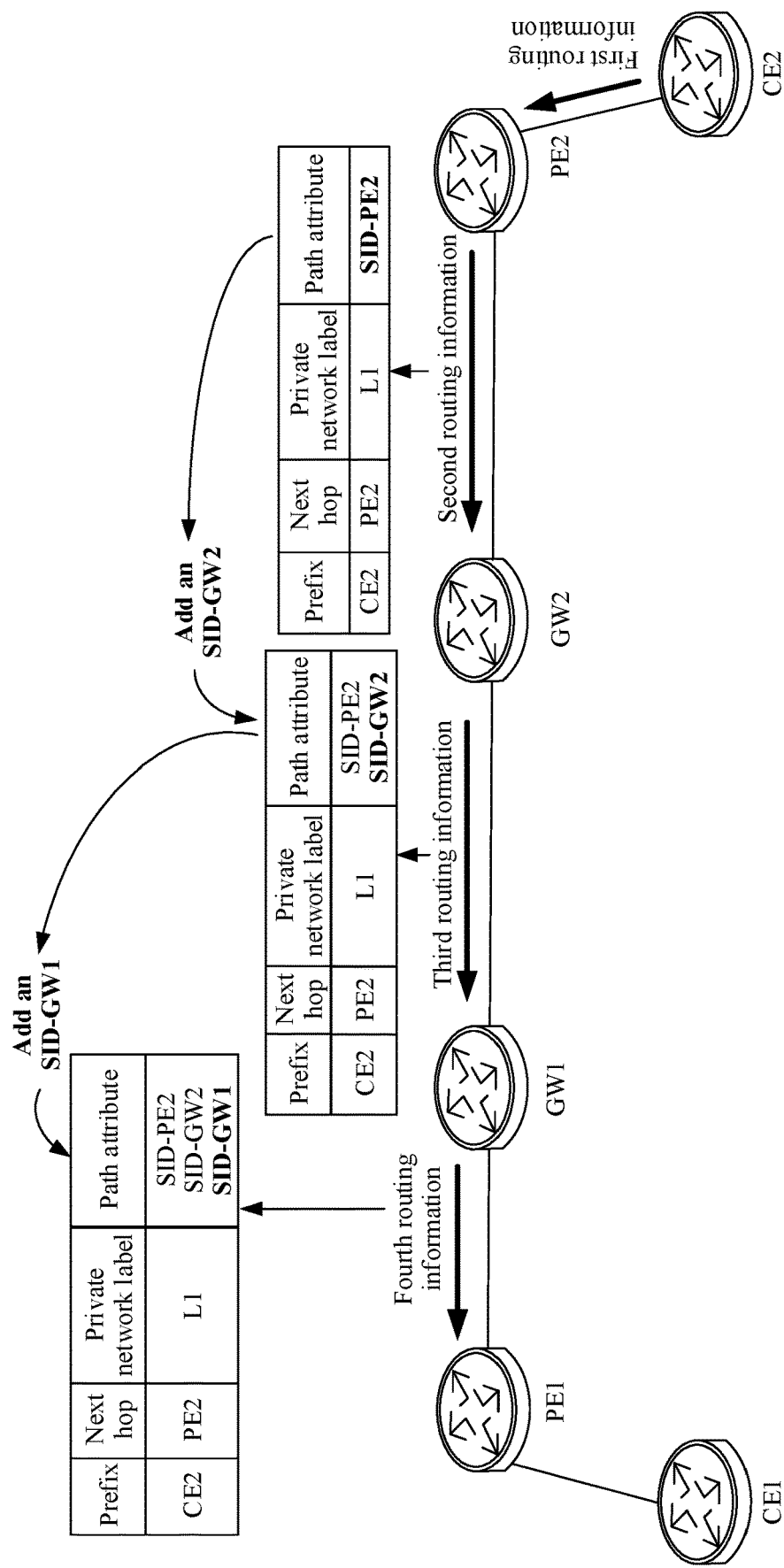
FIG. 3 is a schematic diagram of transmitting a routing message according to an embodiment of this application.

An example in which the PE2 receives the first routing information issued by the CE2 and generates the second routing information based on the first routing information is used for description herein. As shown in FIG. 3, in this case, the second routing information generated by the PE2 includes a node identifier of the destination node, a next-hop identifier, and indication information of the PE2. For example, the node identifier of the destination node may be specifically a prefix address (represented by the CE2 for short in FIG. 3) in a route issued by the CE2, and the next-hop identifier is node identifier information (for example, an IP address and corresponding interface information, represented by the PE2 in FIG. 3) of the PE2. In this way, after learning of the route including the second routing information, another network device may send the packet to the CE2 through the PE2. The CE2 then sends, based on the prefix address, the packet to one or more user hosts connected to the CE2. The second routing information further includes the indication information that is added by the PE2 and that indicates the PE2. For example, the indication information may include a segment identifier (SID), represented by an SID-PE2 in FIG. 3, of the PE2.

The SID in this embodiment of this application may be an SID in any communication technology, for example, a multiprotocol label switching (MPLS) labeling technology or an internet protocol version 6 (IPv6)-based segment routing (SR) technology (also referred to as an SRv6 technology).

Optionally, the indication information of the forwarding node may further include endpoint information of the forwarding node. FIG. 3 uses an example in which the indication information of the forwarding node includes only the SID of the forwarding node.

The endpoint of the forwarding node may identify the forwarding node corresponding to the SID, and may be used to quickly determine the forwarding node corresponding to the SID, to perform operations such as verification, quick positioning, and node maintenance. When the indication information of the forwarding node includes the endpoint, the corresponding forwarding node may be quickly determined based on the indication information of the forwarding node. The endpoint information may be specifically a loopback address on the corresponding forwarding node or the like.

The second routing information may further include other information than the node identifier of the destination node, the next-hop identifier, and the indication information of the PE2. This is not particularly limited in this embodiment of this application. For example, the second routing information may further include a label of a private network in which CE2 is located. FIG. 3 uses an example in which the label of the private network is L1.

In a specific example in which the second routing information is carried in the route issued by the PE2, the node identifier of the destination node may be located in a prefix attribute part (represented as a prefix in FIG. 3) of the route, the next-hop identifier may be located in a next-hop attribute part (represented as a next hop in FIG. 3), and the label of the private network in which the CE2 is located may be located in a private network label attribute part (represented as a private network label in FIG. 3). The indication information of the forwarding node (for example, the indication information of the PE2) may be located in a corresponding attribute field (represented as a path attribute in FIG. 3) indicating an arrangement of a forwarding path. For example, the foregoing attributes may be directly carried in corresponding attribute fields of the issued route (for example, issued through IPv4 unicast), or may be carried in a specified part of a specified attribute field in the route. The specified attribute field may be, for example, a multiprotocol reachability-network layer reachability information field (MP-NLRI).

An arrangement order of various attributes in the route shown in FIG. 3 is merely used as a possible example. In an actual application scenario, an arrangement position and manner of the attributes may be set as required. For example, the attributes may be arranged consecutively or inconsecutively, or may be placed in any proper position in the route. Compared with FIG. 3, content of attribute fields specifically carried in the route may alternatively be added, deleted, or adjusted as required, but includes at least one or more pieces of corresponding indication information indicating one or more necessary forwarding nodes on the forwarding path. A specific arrangement manner and a presentation form of one or more pieces of indication information may change.

S203: The PE2 sends the second routing information to a GW2.

After obtaining the second routing information, the PE2 may send the second routing information to one or more nodes connected to the PE2, for example, the GW2 in FIG. 1.

FIG. 3 shows only the forwarding node GW2 connected to the PE2. In an actual scenario, the PE2 may alternatively be connected to another forwarding node, and send the second routing information to the another forwarding node.

S204: The GW2 adds indication information of the GW2 to the second routing information, to obtain third routing information.

After receiving the second routing information, the GW2 adds the indication information of the GW2 to the second routing information, to update the second routing information to obtain the third routing information. For an explanation of the indication information of the GW2, refer to an explanation of the indication information of the PE2 in S202. Details are not described in this embodiment of this application again.

Because the GW2 adds the indication information of the GW2 to the second routing information, as shown in FIG. 3, the third routing information (which may also be referred to as updated second routing information) obtained by the GW2 may include the node identifier (represented by the CE2 in the figure) of the destination node, the next-hop identifier, the indication information (represented by an SID-PE2 in the figure) of the PE2, and the indication information (represented by an SID-GW2 in the figure) of the GW2, and the next-hop identifier is a node identifier (represented by the PE2 in the figure) of the PE2.

When the path attribute field includes a plurality of pieces of indication information of a plurality of forwarding nodes, the plurality of pieces of indication information may be arranged according to a specific rule. For example, the plurality of pieces of indication information may be sequentially arranged based on routing distances between a forwarding node that receives a route including the plurality of pieces of indication information and the plurality of forwarding nodes to which the plurality of pieces of indication information are added. FIG. 3 is still used as an example. If the PE1 is the forwarding node that receives the route, and in this case, the route separately includes the indication information SID-PE2, SID-GW2, and SID-GW1 respectively added by the GW1, the GW2, and the PE2, the three pieces of indication information may be sequentially arranged based on routing distances between the GW1, the GW2, and the PE2 and the PE1.

A routing distance between two nodes may be represented by a quantity of nodes through which the packet transmitted between the two nodes needs to pass. A large quantity of nodes through which the packet transmitted between the two nodes needs to pass indicates a large routing distance between the two nodes; or a small quantity of nodes through which the packet transmitted between the two nodes needs to pass indicates a small routing distance between the two nodes. For example, the PE1 may transmit the packet to the PE2 through a path PE1-GW1-GW2. To be specific, after being forwarded by the PE1, the packet needs to successively pass through two nodes GW1 and GW2 to reach the PE2. In this case, there is only one hop from the GW1 to the PE1, and there are two hops from the GW2 to the PE1. Therefore, it may be considered that a routing distance between the GW2 and the PE1 is greater than a routing distance between the GW1 and the PE1.

For another example, as shown in FIG. 3, the third routing information includes the SID (represented by the SID-PE2) of the PE2 and an SID (represented by the SID-GW2) of the GW2. Because a routing distance between the PE2 and the PE1 is greater than a routing distance between the GW2 and the PE1, the SID-GW2 may be arranged after the SID-PE2. The foregoing content is intended to describe a possible arrangement manner of the SIDs of the forwarding nodes in the route based on the routing distances. In an actual execution process of route issuing, when adding the indication information of the GW2 to the second routing information, the GW2 may directly add the indication information of the GW2 to a tail of the indication information of the PE2 in the second routing information, and there is no need to actually calculate a routing distance. The arrangement manner in FIG. 3 is merely used as an example. The plurality of pieces of indication information may be arranged in ascending order, or may be arranged in descending order, or may be arranged according to another arrangement rule or arrangement manner that the forwarding nodes may comply with, provided that the current forwarding node that receives the packet may determine (including determining through calculation according to a preset rule) a position of the indication information corresponding to the current forwarding node and a position of the indication information corresponding to the next-hop forwarding node based on the plurality of pieces of indication information carried in the packet. In this way, the current forwarding node may determine an operation that the current forwarding node needs to perform and a forwarding node to which the packet is forwarded. For example, when adding the SID to the issued route, each forwarding node may add indication bit indicating a sorting position of the SID.

S205: The GW2 sends the third routing information to a GW1.

For a process in which the GW2 sends the third routing information to the GW1, refer to a process in which the PE2 sends the second routing information to the GW2 in S203. Details are not described in this embodiment of this application again.

S206: The GW1 adds indication information of the GW1 to the third routing information, to obtain fourth routing information.

For a process in which the GW1 adds the indication information of the GW1 to the third routing information, to obtain the fourth routing information, refer to a process in which the GW2 adds the indication information of the GW2 to the second routing information, to obtain the third routing information in S204. Details are not described in this embodiment of this application again.

Still refer to FIG. 3. The fourth routing information includes the node identifier (represented by as the CE2) of the destination node, the next-hop identifier, the indication information (represented by the SID-PE2) of the PE2, the indication information (represented by the SID-GW2) of the GW2, and the indication information (represented by the SID-GW1) of the GW1, and the next-hop identifier is the node identifier (represented by the PE2) of the PE2.

S207: The GW1 sends the fourth routing information to a PE1.

For a process in which the GW1 sends the fourth routing information to the PE1, refer to a process in which the PE2 sends the second routing information to the GW2 in S203. Details are not described in this embodiment of this application again.

After the GW1 sends the fourth routing information to the PE1, the PE1 may receive the fourth routing information. After receiving the route that is sent by the GW1 and that includes the fourth routing information, the PE1 may store the fourth routing information in a local route forwarding table, to perform subsequent packet forwarding. The PE1 may alternatively advertise, through a private network route or the like, the route reaching the destination node to a CE1 connected to the PE1. FIG. 3 is still used as an example. In this case, the advertisement route received by the CE1 may include the prefix address previously issued by the CE2 and identifier information of the next hop (such as an IP address of the PE1 and an interface through which the PE1 is connected to the CE1). After learning of the route of the CE2, the CE1 may implement packet forwarding in which the CE1 is used as the source node, or the user host connected to the CE1 is used as the source node.

S208: The CE1 sends a first packet to the PE1, where the first packet includes the node identifier of the destination node.

When the CE1 needs to send the first packet to the CE2, the CE1 may include, in the first packet, the node identifier (namely, a destination address) of the destination node issued by the CE2, and send the first packet to the PE1, so that the PE1 forwards the first packet to the CE2.

S209: The PE1 updates the first packet, to obtain a second packet, where the second packet includes the node identifier of the destination node, the indication information of the PE2, the indication information of the GW2, and the indication information of the GW1.

Before S208, the PE1 receives the fourth routing information sent by the GW1, where the fourth routing information is carried in an updated route of the CE2 issued by the GW1. After receiving the fourth routing information, the PE1 may associatively store, in the local route forwarding table, information, such as the indication information of the plurality of forwarding nodes, the node identifier of the destination node, and the next-hop identifier, included in the routing information. In this way, after receiving the first packet, the PE1 may determine, based on the node identifier of the destination node, the indication information corresponding to the plurality of forwarding nodes in the route forwarding table, and add the indication information of the plurality of forwarding nodes to the first packet, to update the first packet to obtain the second packet. For example, the second packet includes at least the node identifier of the destination node, and further includes the indication information of the PE2, the indication information of the GW2, and the indication information of the GW1 that are added by the PE1. The indication information indicates that the packet is forwarded along the GW1, the GW2, and the PE2.

Figure 4:
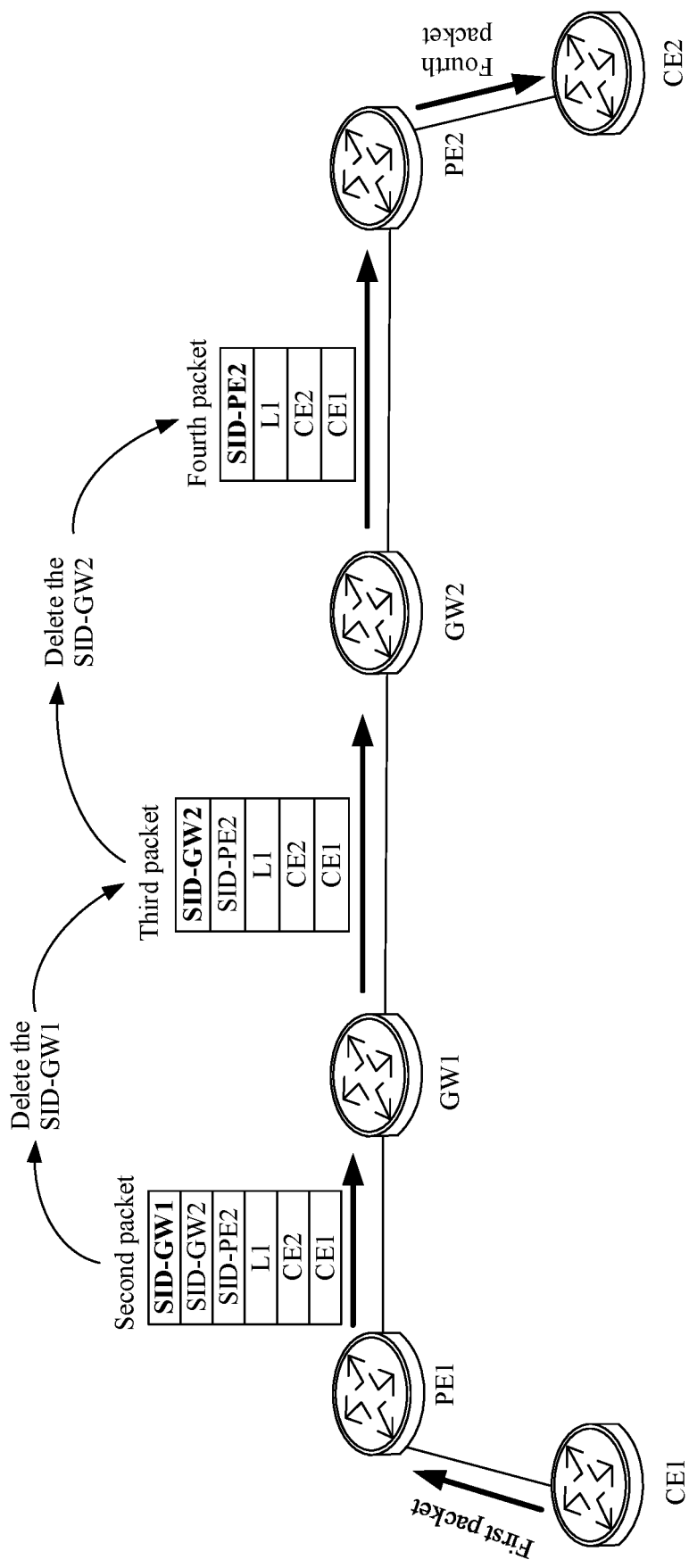
FIG. 4 is a schematic diagram of transmitting a packet according to an embodiment of this application.

An arrangement order of the indication information of the forwarding nodes in the second packet may be related to an arrangement order of the indication information of the forwarding nodes in the fourth routing information. For example, the arrangement order of the indication information of the forwarding nodes in the second packet is reverse to the arrangement order of the indication information of the forwarding nodes in the fourth routing information. For example, as shown in FIG. 3, the indication information (represented by the SID-GW2) of the PE2 and the GW2 and the indication information (represented by the SID-GW1) of the GW1 in the fourth routing information are sequentially arranged. However, as shown in FIG. 4, the indication information (represented by the SID-PE2) of the PE2, the indication information (represented by the SID-GW2) of the GW2, and the indication information (represented by the SID-GW1) of the GW1 in the second packet are sequentially arranged in reverse order. In this way, the plurality of pieces of indication information arranged in reverse order may sequentially reach the corresponding nodes and are popped from a stack. In another case, the plurality of pieces of indication information may alternatively be arranged according to another rule.

Optionally, the second packet further includes other information than the node identifier of the destination node, the indication information of the PE2, the indication information of the GW2, and the indication information of the GW1. For example, as shown in FIG. 4, the second packet may further include the label (represented by L1) of the private network in which the CE2 is located. The label of the private network may be obtained from the fourth routing information, and may be associatively stored in the route forwarding table with other related information including the indication information. The second packet further includes the next-hop identifier (for example, the PE2). The second packet may further include a node identifier (for example, an IP address) of the source node, and the source node is an initial sender of the packet, for example, the CE1 or the user host connected to the CE1. Both the node identifier of the source node and the node identifier of the destination node may be located in a load part of the second packet, and the load part may further include data (not shown in FIG. 4) that needs to be transmitted by the CE1.

S210: The PE1 sends the second packet to the GW1.

After obtaining the second packet, the PE1 may send, based on indication information (for example, the SID-GW1) of a forwarding node ranked first in the second packet, the second packet to the forwarding node GW1 indicated by the indication information.

S211: The GW1 deletes the indication information of the GW1 from the second packet, to obtain a third packet.

After receiving the second packet, if finding that, for example, the indication information ranked first in an indication information list matches the indication information of the GW1, the GW1 may delete or replace, by popping the indication information from a stack or updating a packet header including the indication information, the indication information (for example, the SID-GW1) of the forwarding node ranked first, to update the second packet to obtain the third packet shown in FIG. 4. The third packet includes the node identifier (represented by the CE2) of the destination node, the indication information (represented by the SID-GW2) of the GW2, and the indication information (represented by the SID-PE2) of the PE2, but does not include the indication information SID-GW1 of the GW1.

S212: The GW1 sends the third packet to the GW2.

After obtaining the third packet, the GW1 may send the third packet to the forwarding node GW2 based on the indication information (for example, the SID-GW2) of the forwarding node ranked first in the third packet.

S213: The GW2 deletes the indication information of the GW2 from the third packet, to obtain a fourth packet.

After receiving the third packet, if finding that, for example, the indication information ranked first in the indication information list matches the indication information of the GW2, the GW2 may delete or replace, by popping the indication information from a stack and updating the packet header, for example, a segment routing header (SRH), including the indication information, the indication information (for example, the SID-GW2) of the forwarding node ranked first, to update the third packet to obtain the fourth packet shown in FIG. 4. The fourth packet includes the node identifier (represented by the CE2) of the destination node and the indication information (represented by the SID-PE2) of the PE2, but does not include the indication information SID-GW1 of the GW1 and the indication information SID-GW2 of the GW2.

S214: The GW2 sends the fourth packet to the PE2.

After obtaining the fourth packet, the GW2 may send the fourth packet to the forwarding node PE2 based on the indication information (for example, the SID-PE2) of the forwarding node ranked first in the fourth packet.

S215: The PE2 forwards the fourth packet to the CE2 based on the node identifier of the destination node.

For example, the PE2 forwards the received fourth packet to the CE2 based on the prefix address issued by the node identifier CE2 of the destination node, so that after receiving the fourth packet, the CE2 sends the fourth packet to the user hosts covered by the prefix address.

An example in which the first routing information obtained by the PE2 in S201 is from the CE2 is used in this embodiment of this application. In this case, the PE2 needs to forward the fourth packet to the CE2 based on the node identifier of the destination node in S215. When the first routing information obtained by the PE2 in S201 is not from the CE2, for example, the first routing information is the routing information issued by the PE2 based on the locally configured loopback address in a VPN instance, the loopback address is the node identifier of the destination node. In S215, the PE2 stores the fourth packet based on the node identifier of the destination node.

In conclusion, in the route determining method provided in this embodiment of this application, because the routing information of the destination node carries the indication information of the forwarding node, after receiving the routing information, the forwarding node connected to the source node may determine, based on the one or more pieces of indication information corresponding to one or more forwarding nodes in the routing information, a route and a transmission path for sending a packet to the destination node, to forward the packet to the destination node based on the route and the transmission path. This method avoids that the forwarding node connected to the source node determines the transmission path by transmitting a large quantity of control packets, thereby reducing network load.

Figure 5B:
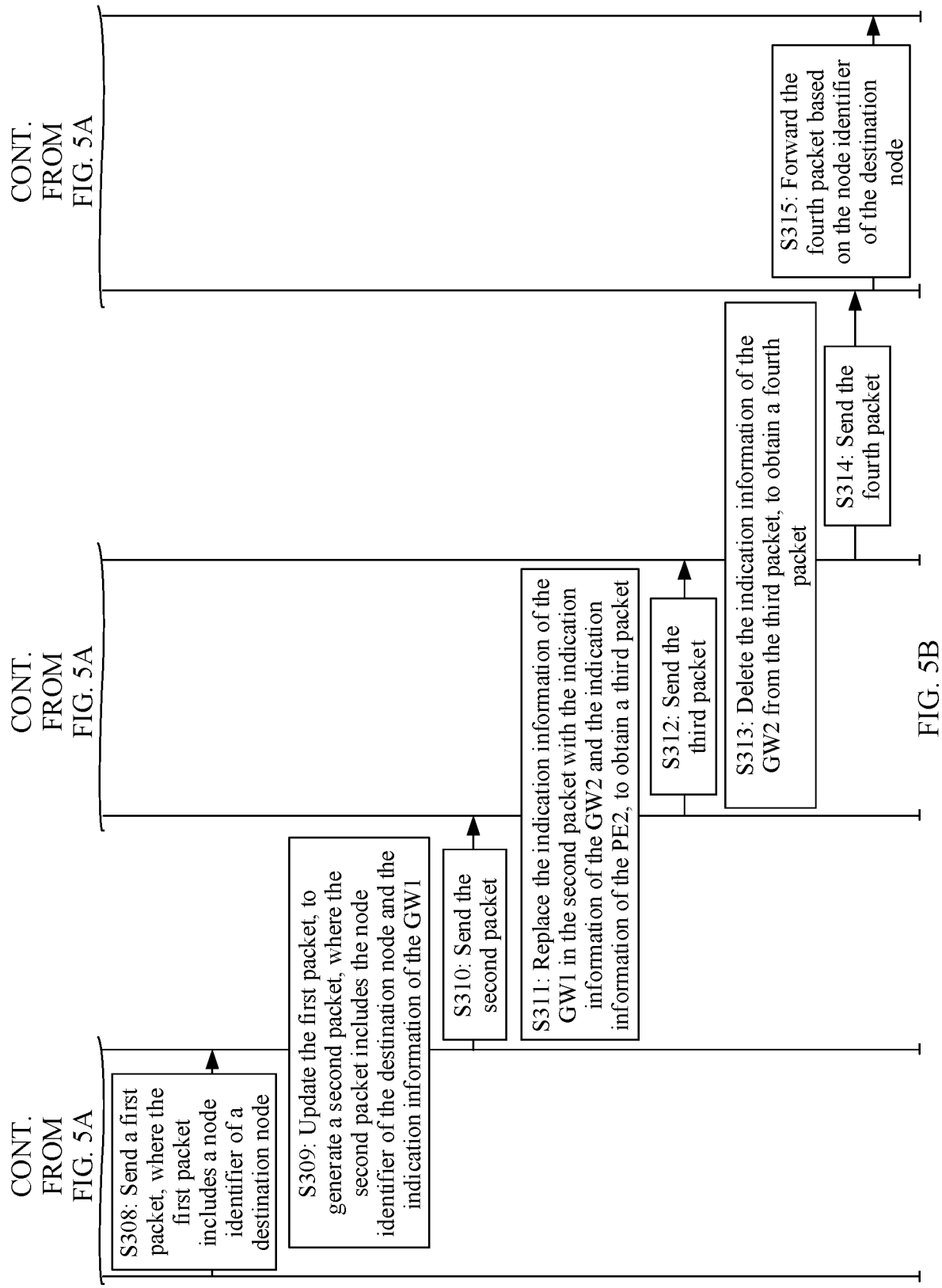

For example, FIG. 5A and FIG. 5B are a flowchart of another route determining method according to an embodiment of this application. In addition, the application scenario shown in FIG. 1 is used as an example in the route determining method. As shown in FIG. 5A and FIG. 5B, the route determining method includes the following steps.

S301: A CE2 sends first routing information to a PE2.

For S301, refer to S201. Details are not described in this embodiment of this application again.

S302: The PE2 generates second routing information based on the first routing information, where the second routing information includes indication information of the PE2.

For S302, refer to S202. Details are not described in this embodiment of this application again.

S303: The PE2 sends the second routing information to a GW2.

For S303, refer to S203. Details are not described in this embodiment of this application again.

S304: The GW2 adds indication information of the GW2 to the second routing information, to obtain third routing information.

For S304, refer to S204. Details are not described in this embodiment of this application again.

S305: The GW2 sends the third routing information to a GW1.

For S305, refer to S205. Details are not described in this embodiment of this application again.

S306: The GW1 updates a next-hop identifier in the third routing information to a node identifier of the GW1, and replaces indication information of at least one forwarding node in the third routing information with indication information of the GW1, to obtain fourth routing information.

In the embodiment shown in FIG. 2A to FIG. 2C, after the PE2 sets next-hop attribute information to identifier information of the PE2, all other forwarding nodes on a route issuing path do not modify the next-hop attribute information. However, in this embodiment of this application, there is at least one node that changes the next-hop identifier in the plurality of forwarding nodes, and an example in which the node GW1 changes the next-hop identifier is used in this embodiment of this application.

Figure 6:
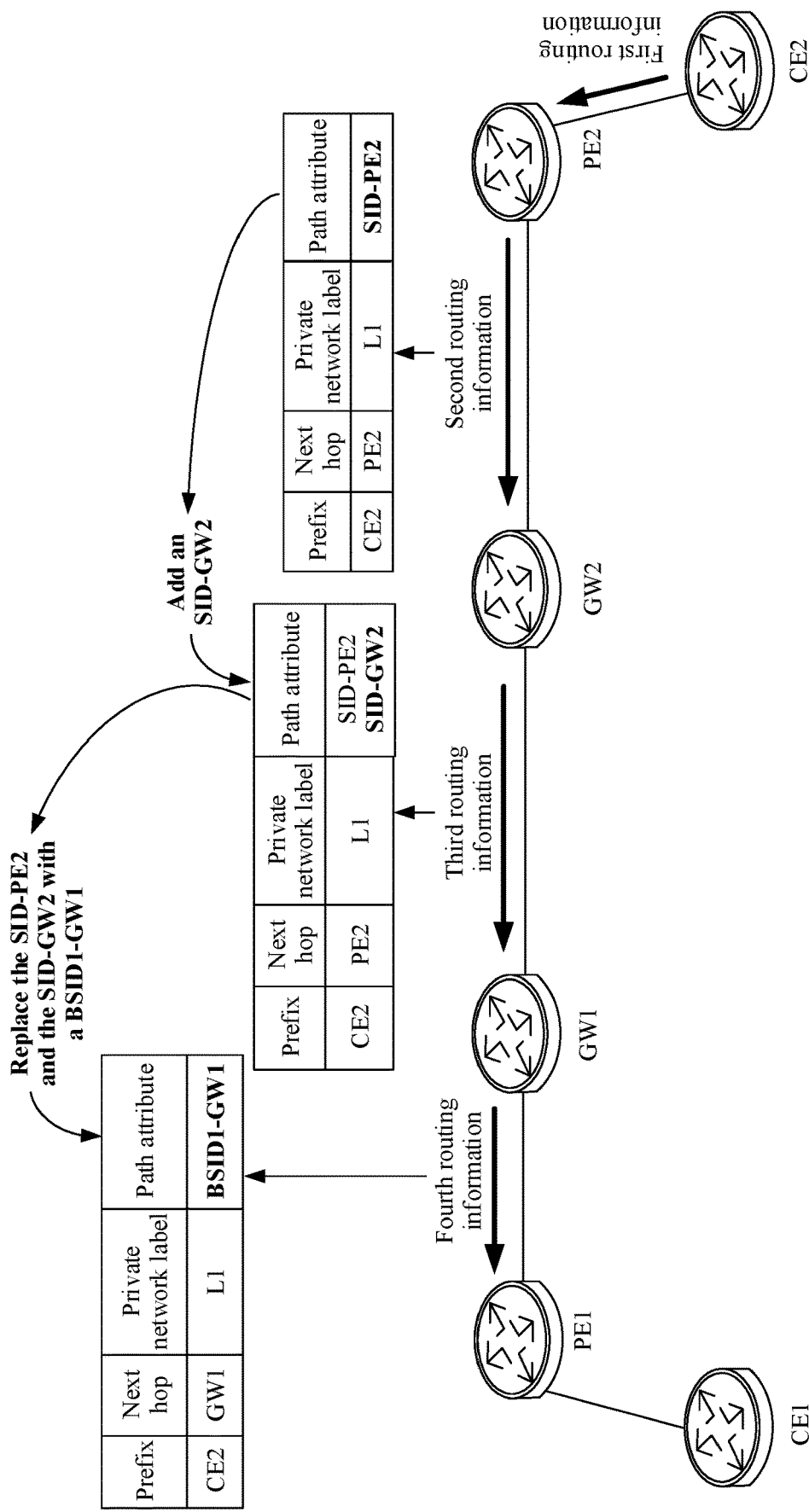
FIG. 6 is a schematic diagram of transmitting another routing message according to an embodiment of this application.

After receiving routing information, the forwarding node that changes the next-hop identifier changes a next-hop identifier in the routing information to a node identifier of the forwarding node. For example, refer to FIG. 6. The GW1 changes the next-hop identifier from a node identifier (represented by the PE2) of the PE2 to the node identifier (represented by the GW1) of the GW1. In addition, the node that changes the next-hop identifier may further replace indication information of all forwarding nodes (including the at least one forwarding node) in the routing information with indication information of the node. For example, refer to FIG. 6. The GW1 replaces the indication information (represented by SID-PE2) of the PE2 and the indication information (represented by SID-GW2) of the GW2 in the third routing information with the indication information of the GW1. In this way, the fourth routing information obtained by the GW1 in S306 includes a node identifier (represented by the CE2) of a destination node, the next-hop identifier, and the indication information of the GW1, and the next-hop identifier is the node identifier of the GW1.

For example, the indication information of the GW1 added by the GW1 to the third routing information in S306 may be any proper type of indication information. In a possible example, the indication information added by the GW1 includes a binding segment identifier (BSID) of the GW1 (that is, in this case, a segment identifier type of the indication information is the BSID). In another possible case, the BSID of the GW1 may alternatively be replaced with an SID of the GW1 (in this case, the segment identifier type of the indication information is the SID). This is not limited in this embodiment of this application.

After the GW1 replaces the indication information of the at least one forwarding node in the third routing information with the indication information of the GW1, the GW1 may further record a correspondence between the indication information of the GW1 and the replaced indication information of the at least one forwarding node. For example, as shown in Table 1, the GW1 may record a correspondence between the indication information (BSID1-GW1) of the GW1 and the replaced indication information (represented by the SID-PE2) of the PE2 and the replaced indication information (represented by the SID-GW2) of the GW2. In addition, an arrangement order of the replaced indication information of the at least one node in the correspondence may be the same as an arrangement order of the indication information in the third routing information.

TABLE 1

| Indication information of a GW1 | Indication information of at least one forwarding node |
| --- | --- |
| BSID1-GW1 | SID-PE2 and SID-GW2 |
| BSID2-GW1 | SID-PE2, SID-GW2, and SID-GW3 |

Although an example in which the GW1 receives the fourth routing information is used in the foregoing descriptions, in an actual application scenario, the GW1 may receive routing information sent by a plurality of nodes. When receiving the routing information sent by the plurality of nodes, the GW1 updates each piece of routing information (for details, refer to S306), and the indication information of the GW1 added by the GW1 to different routing information is different.

For example, still refer to Table 1. It is assumed that after receiving routing information (including the SID-GW3, the SID-GW2, and the SID-PE2) sent by a node GW3 (not shown in the figure), the GW1 replaces indication information (SID-GW3) of the GW3, indication information (SID-GW2) of the GW2, and the indication information (SID-PE2) of the PE2 with the BSID2-GW1. The BSID1-GW1 is different from the BSID2-GW1.

S307: The GW1 sends the fourth routing information to a PE1.

For S307, refer to S207. Details are not described in this embodiment of this application again.

S308: The CE1 sends a first packet to the PE1, where the first packet includes the node identifier of the destination node.

For S308, refer to S208. Details are not described in this embodiment of this application again.

S309: The PE1 updates the first packet, to generate a second packet, where the second packet includes the node identifier of the destination node and the indication information of the GW1.

Optionally, the second packet may further include information such as an identifier of a source node and a private network label. For S309, refer to S209. Details are not described in this embodiment of this application again.

S310: The PE1 sends the second packet to the GW1.

For S310, refer to S210. Details are not described in this embodiment of this application again.

S311: The GW1 replaces the indication information of the GW1 in the second packet with the indication information of the GW2 and the indication information of the PE2, to obtain a third packet.

After receiving the second packet, the GW1 may remove the indication information (where the indication information may be of a BSID type) of the GW1 from the second packet by popping the indication information from a stack or in another manner, and add, based on a correspondence between the locally stored indication information of the GW1 and at least one piece of indication information, the at least one piece of indication information to the second packet, to obtain the third packet. Refer to Table 1. When the indication information of the GW1 in the second packet is the BSID1-GW1, the at least one piece of indication information includes the indication information (represented by the SID-GW2) of the GW2 and the indication information (represented by the SID-PE2) of the PE2. In addition, an arrangement order of the at least one piece of indication information added by the GW1 to the second packet may be the same as or reverse to an arrangement order of the indication information recorded in the correspondence.

Figure 7:
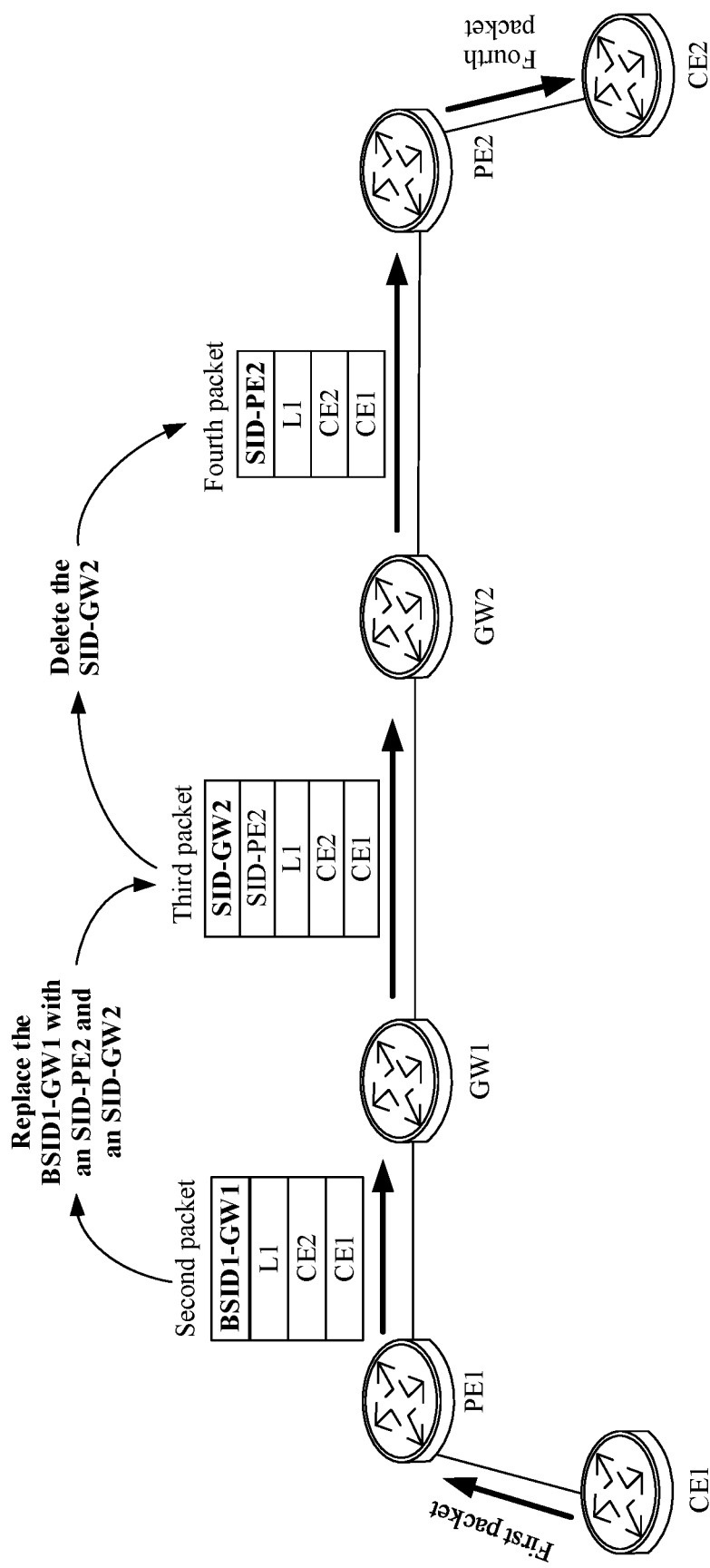
FIG. 7 is a schematic diagram of transmitting another packet according to an embodiment of this application.

As shown in FIG. 7, the third packet obtained by the GW1 in S311 includes the node identifier (represented by the CE2) of the destination node, the indication information (represented by the SID-GW2) of the GW2, and the indication information (represented by the SID-PE2) of the PE2, but does not include the indication information BSID1-GW1 of the GW1.

S312: The GW1 sends the third packet to the GW2.

For S312, refer to S212. Details are not described in this embodiment of this application again.

S313: The GW2 deletes the indication information of the GW2 from the third packet, to obtain a fourth packet.

For S313, refer to S213. Details are not described in this embodiment of this application again.

S314: The GW2 sends the fourth packet to the PE2.

For S314, refer to S214. Details are not described in this embodiment of this application again.

S315: The PE2 forwards the fourth packet to the CE2 based on the node identifier of the destination node.

For S315, refer to S215. Details are not described in this embodiment of this application again.

An example in which the first routing information obtained by the PE2 in S301 is from the CE2 is used in this embodiment of this application. In this case, the PE2 needs to forward the fourth packet to the CE2 based on the node identifier of the destination node in S315. When the first routing information obtained by the PE2 in S301 is not from the CE2, for example, the first routing information is the routing information issued by the PE2 based on the locally configured loopback address in a VPN instance, the loopback address is the node identifier of the destination node. In S315, the PE2 stores the fourth packet based on the node identifier of the destination node.

In conclusion, in the route determining method provided in this embodiment of this application, because the routing information of the destination node carries the indication information of the forwarding node, after receiving the routing information, the forwarding node connected to the source node may determine, based on the indication information of the forwarding node in the routing information, a route and a transmission path for sending a packet to the destination node, to forward the packet to the destination node based on the route and the transmission path. This process avoids that the forwarding node connected to the source node determines the transmission path by transmitting control packets, so that network load is reduced. A next hop is allowed to be changed during route issuing. This also improves flexibility of establishing the route.

It should be noted that in the embodiments shown in FIG. 2A to FIG. 2C and FIG. 5A and FIG. 5B, there may be another forwarding node except the GW1 and the GW2 between the PE1 and the PE2.

When there is the another forwarding node in the embodiment shown in FIG. 2A to FIG. 2C (for example, there is another forwarding node between the GW1 and the PE1 or between the GW1 and the PE2), after receiving routing information, the forwarding node may update the routing information with reference to an execution manner of the GW2 in FIG. 2A to FIG. 2C, and send, to a connected node, new routing information obtained after update. After receiving a packet, the forwarding node may update the packet with reference to the execution manner of the GW2 in FIG. 2A to FIG. 2C, and send, to the connected node, a new packet obtained after update.

When there is the another forwarding node in the embodiment shown in FIG. 5A and FIG. 5B (for example, there is another forwarding node between the GW1 and the PE1 or between the GW1 and the PE2), if the forwarding node is not a node that changes the next hop, after receiving routing information, the forwarding node may update the routing information with reference to the execution manner of the GW2 in FIG. 2A to FIG. 2C, and send, to a connected node, new routing information obtained after update. After receiving a packet, the forwarding node may update the packet with reference to the execution manner of the GW2 in FIG. 2A to FIG. 2C, and send, to the connected node, a new packet obtained after update.

For example, in the embodiment shown in FIG. 5A and FIG. 5B, there is the another forwarding node between the GW1 and the PE1. After receiving the fourth routing information, the forwarding node adds SID indication information of the forwarding node after the BSID1-GW1 to the fourth routing information. After receiving the packet, the forwarding node deletes or replaces the indication information of the forwarding node in the packet, to obtain a new packet, and sends the new packet to a node indicated by next indication information.

When there is the another forwarding node in the embodiment shown in FIG. 5A and FIG. 5B (for example, there is another forwarding node between the GW1 and the PE1 or between the GW1 and the PE2), if the forwarding node is a node that changes the next hop, after receiving routing information, the forwarding node may update the routing information with reference to the execution manner of the GW1 in FIG. 5A and FIG. 5B, and send, to a connected node, new routing information obtained after update. After receiving a packet, the forwarding node may update the packet with reference to the execution manner of the GW1 in FIG. 5A and FIG. 5B, to obtain a new packet, and send the new packet to a node indicated by the 1st piece of indication information.

In S209 and S309, the PE1 may update the first packet in a plurality of manners, to obtain the second packet. This embodiment of this application provides at least the following two manners.

1. In a first manner, the PE1 may find, based on a destination node to which the first packet needs to be sent, routing information (which may also be referred to as a routing entry or a forwarding entry) corresponding to the destination node from the route forwarding table stored in the PE1. The routing information is obtained based on the previously received route issued by the GW1. The routing information may include indication information of forwarding nodes through which the route passes before reaching the PE1, and a correspondence between each piece of the indication information of the forwarding nodes and the node identifier of the destination node. In this case, the PE1 may directly extract indication information of the corresponding forwarding nodes (for example, the indication information of the GW1, the GW2, and the PE2) from the routing information based on the node identifier of the destination node carried in the first packet, and add the indication information to the first packet, to obtain the second packet. The routing information in the route forwarding table may further include the next-hop identifier, the private network label, and the like.

2. In a second manner, after receiving the route that includes the routing information and that is issued by the GW1, the PE1 may establish a correspondence between the node identifier of the destination node and tunnel information based on the routing information, where the tunnel information includes indication information of forwarding nodes in the routing information. For example, each piece of tunnel information corresponds to one tunnel, and the tunnel includes a forwarding node indicated by each piece of indication information in the tunnel information. An arrangement order of the indication information of the forwarding nodes in the tunnel information may be, for example, reverse to that of the indication information of the forwarding node in the routing information, and the forwarding nodes are sequentially arranged in the tunnel based on the arrangement order of the indication information of the forwarding nodes in the tunnel information. When forwarding a packet, the PE1 may determine corresponding routing information based on a node identifier of a destination node in the packet, and perform tunnel iteration based on next-hop information in the routing information, to determine tunnel information corresponding to a next-hop node indicated by the next-hop information. A destination node of a tunnel corresponding to the tunnel information is the next-hop node.

For example, the embodiment shown in FIG. 2A to FIG. 2C is used as an example. As shown in Table 2, after receiving the fourth routing information (where the indication information in the fourth routing information includes the SID-PE2, the SID-GW2, and the SID-GW1), the PE1 may establish a correspondence between the node identifier of the destination node (shown as the CE2 in FIG. 2A to FIG. 2C and shown as an address of the destination node in Table 2) and tunnel information 1. The tunnel information 1 includes indication information of the forwarding nodes (for example, the SID-GW1, the SID-GW2, and the SID-PE2 in FIG. 3) in the fourth routing information. The SID-GW1, the SID-GW2, and the SID-PE2 in the tunnel information 1 in Table 2 are sequentially arranged, and a tunnel corresponding to the tunnel information 1 is GW1-GW2-PE2. A destination node of the tunnel is PE2.

Figure 8:
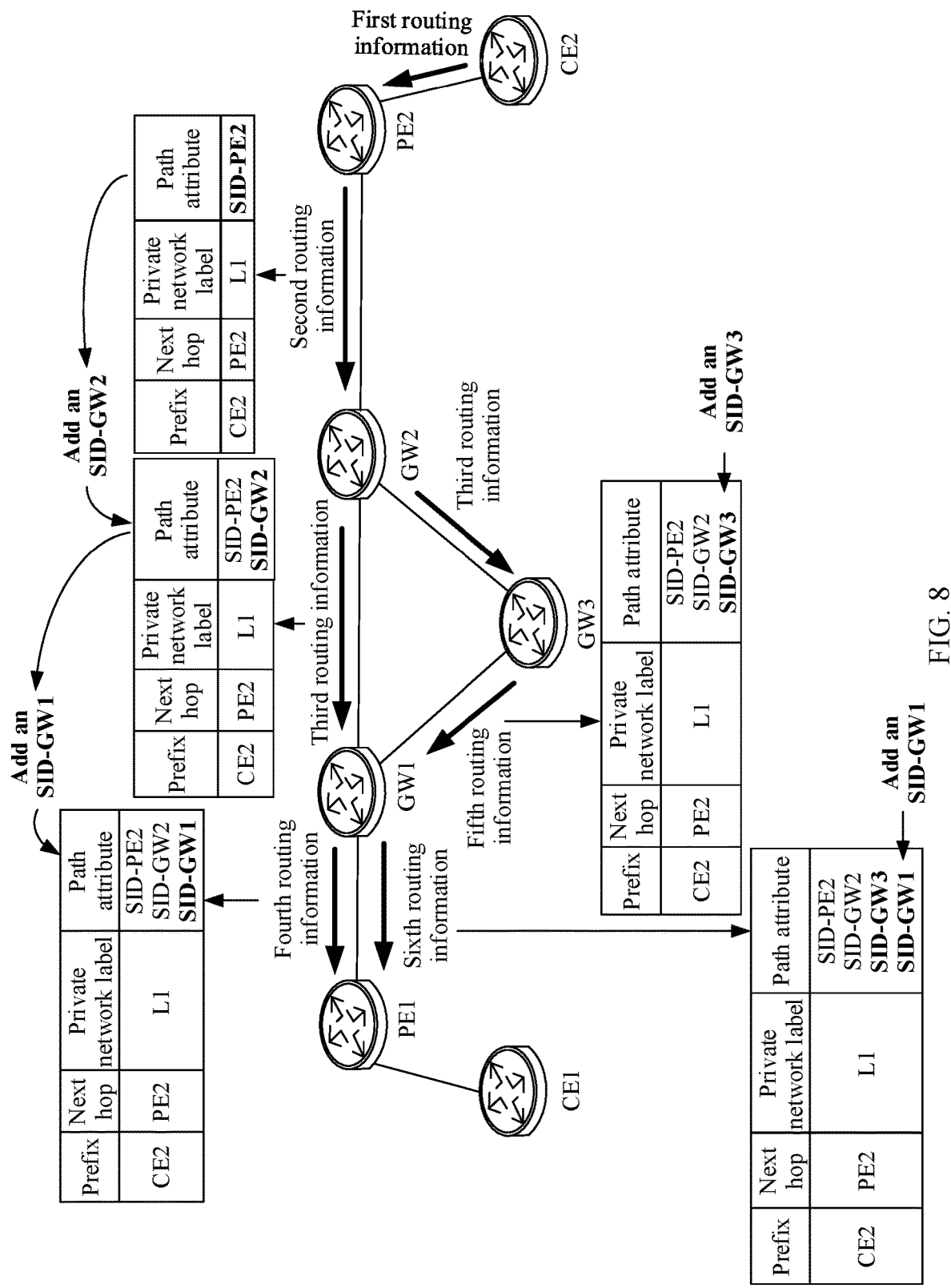
FIG. 8 is a schematic diagram of transmitting still another routing message according to an embodiment of this application.

In the embodiment shown in FIG. 2A to FIG. 2C, if the forwarding node further includes the GW3 in FIG. 8, and the GW3 is connected to each of the GW1 and the GW2, the GW2 sends the third routing information to each of the GW1 and the GW3 in S205, and after receiving the third routing information, the GW3 adds indication information (which may be represented by an SID-GW3) of the GW3 to the third routing information, to obtain fifth routing information. Then, the GW3 sends the fifth routing information to the GW1. The GW1 adds the indication information of the GW1 to the fifth routing information, to obtain sixth routing information, and sends the sixth routing information to the PE1. In this case, the PE1 can receive both the fourth routing information and the sixth routing information, and indication information in the sixth routing information includes the SID-PE2, the SID-GW2, the SID-GW3, and the SID-GW1. The PE1 may further generate, based on the sixth routing information, tunnel information 2 shown in Table 2, including the SID-GW1, the SID-GW2, the SID-GW3, and the SID-PE2. A node identifier of the destination node corresponding to the tunnel information is shown as an address of the destination node in Table 2. The destination node of a tunnel corresponding to the tunnel information is also the PE2, that is, corresponds to a next-hop identifier in the sixth routing information.

TABLE 2

| Node identifier | Tunnel information |
| --- | --- |
| Address of a destination node | 1. Include an SID-GW1, an SID-GW2, and an SID-PE2 |
| Address of a destination node | 2. Include an SID-GW1, an SID-GW2, an SID-GW3, and an SID-PE2 |

For another example, the embodiment shown in FIG. 5A and FIG. 5B is used as an example. As shown in Table 3, after receiving the fourth routing information (where the indication information in the fourth routing information includes the BSID1-GW1), the PE1 may establish a correspondence between the node identifier of the destination node and tunnel information 1. The tunnel information 1 includes indication information (for example, the BSID1-GW1 in FIG. 6) of each forwarding node in the fourth routing information. The destination node of the tunnel is the GW1. The reason is that in this case, the next-hop identifier in the fourth routing information has been changed from the PE2 to the GW1 on the forwarding node GW1. In this case, at least one type of information based on which the PE1 searches for the tunnel information may include the node identifier of the destination node carried in the first packet.

Figure 9:
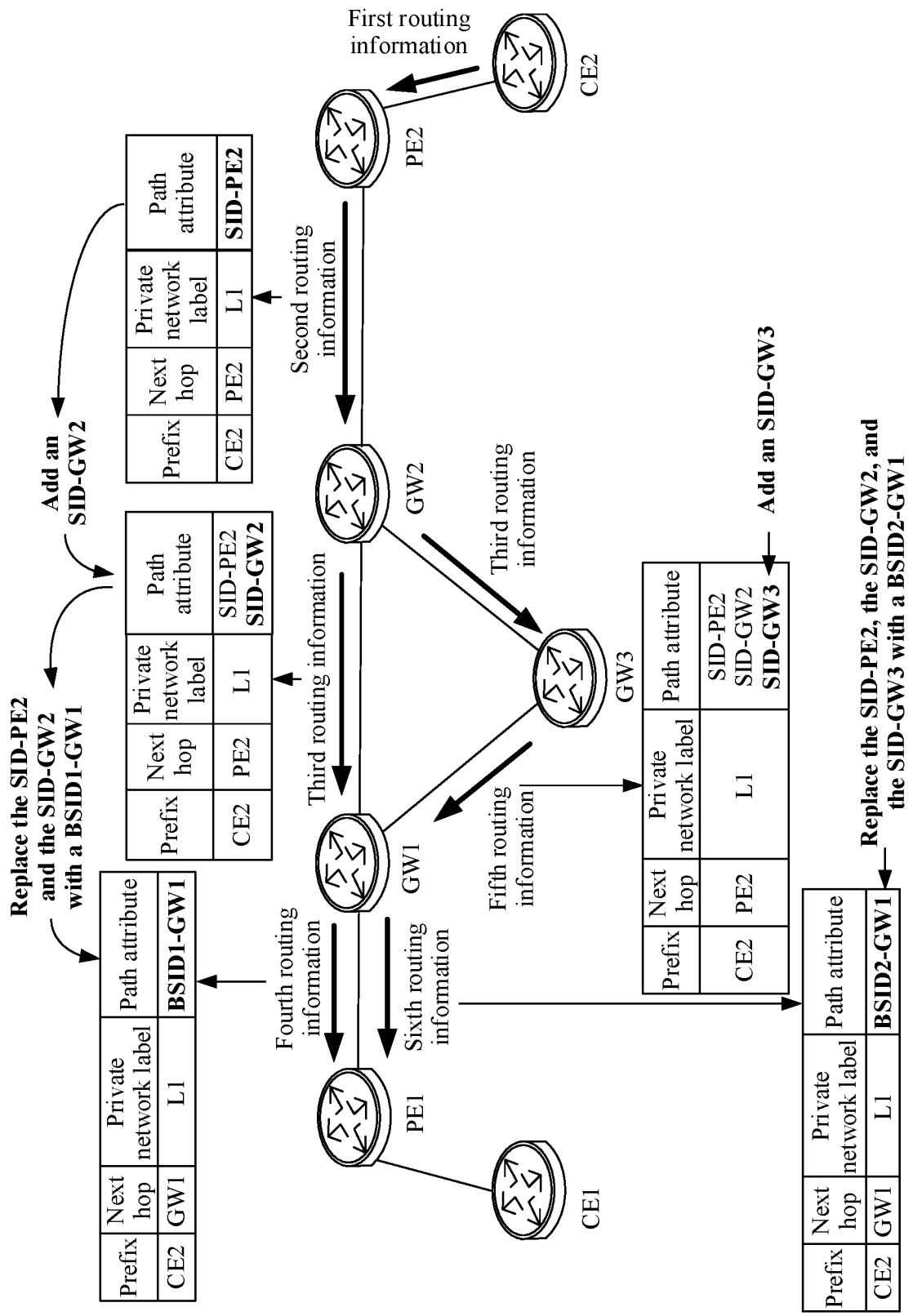
FIG. 9 is a schematic diagram of transmitting still another packet according to an embodiment of this application.

In the embodiment shown in FIG. 5A and FIG. 5B, if the forwarding node may further include the GW3 in FIG. 9, and the GW3 is connected to each of the GW1 and the GW2, the GW2 sends the third routing information to each of the GW1 and the GW3 in S305, and after receiving the third routing information, the GW3 adds indication information (which may be represented by an SID-GW3) of the GW3 to the third routing information, to obtain fifth routing information. Then, the GW3 sends the fifth routing information to the GW1. The GW1 replaces all indication information (the SID-PE2, the SID-GW2, and the SID-GW3) in the fifth routing information with the indication information (for example, the BISD2-GW1) of the GW1, to obtain sixth routing information, and sends the sixth routing information to the PE1. In this case, the PE1 can receive both the fourth routing information and the sixth routing information, and indication information in the sixth routing information includes the BISD2-GW1. The PE1 may further generate, based on the sixth routing information, tunnel information 2 shown in Table 3, including the BISD2-GW1. The destination node of a tunnel corresponding to the tunnel information is the GW1.

TABLE 3

| Node identifier | Tunnel information |
| --- | --- |
| Address of a destination node | 1. Include a BISD1-GW1 |
| Address of a destination node | 2. Include a BISD2-GW1 |

The tunnel may be any tunnel, for example, an end-to-end (E2E) tunnel, a segment routing (SR) tunnel, or a segment routing traffic engineering (SR-TE) tunnel.

In the second manner, in a process of processing the first packet to obtain the second packet, the PE1 may find corresponding tunnel information based on the at least one type of information (for example, the node identifier of the destination node), and process the first packet based on the tunnel information, to obtain the second packet. The tunnel information includes identifier information added by the corresponding forwarding nodes on a forwarding path.

The first packet may further carry a next-hop identifier (for example, the node identifier of the PE2 in the embodiment shown in FIG. 2A to FIG. 2C, or the node identifier of the GW1 in the embodiment shown in FIG. 5A and FIG. 5B), and the next-hop identifier is previously carried in the route that is learned by the PE1 and that corresponds to the CE2. After learning of the route, the PE1 may create local routing information (namely, a forwarding entry). The local routing information may include a correspondence between the node identifier of the destination node, the next-hop identifier, and the tunnel, and the tunnel in the correspondence may be represented by, for example, a tunnel identifier. In this case, the PE1 may perform tunnel searching and iteration based on the node identifier of the destination node and the next-hop identifier, to add the corresponding tunnel information (that is, including the indication information of the forwarding nodes) to the local routing information, so that the packet is forwarded along a specified path based on the indication information of the forwarding nodes. In this case, the at least one type of information based on which the PE1 searches for the tunnel information may further include a next-hop identifier that corresponds to the destination node and that is carried in the first packet.

The first packet may further carry a label of a private network in which the CE2 is located (for example, L1 in the embodiments shown in FIG. 2A to FIG. 2C and FIG. 5A and FIG. 5B). In this case, the route forwarding table includes a correspondence between the node identifier of the destination node, the next-hop identifier, the label of the private network in which the CE2 is located, and the tunnel (tunnel identifier). In this case, the at least one type of information based on which the PE1 searches for the tunnel information may further include a label, carried in the first packet, of the private network in which the destination node is located.

It should be noted that when the PE1 finds a plurality of pieces of tunnel information (for example, the tunnel information 1 and the tunnel information 2 in Table 2 and Table 3) based on the at least one type of information, the PE1 may select one piece of tunnel information from the plurality of pieces of tunnel information in any manner, and process the first packet based on the tunnel information. For example, the PE1 may determine, based on a tunnel constraint (for example, a transmission delay condition or a bandwidth condition), one piece of tunnel information from the plurality of pieces of tunnel information corresponding to the node identifier of the destination node carried in the first packet, where a tunnel corresponding to the tunnel information meets the tunnel constraint. In the embodiment shown in FIG. 2A to FIG. 2C, an example in which the selected tunnel information is the tunnel information 1 in Table 2 is used. In the embodiment shown in FIG. 5A and FIG. 5B, an example in which the selected tunnel information is the tunnel information 1 in Table 3 is used.

Figure 10:
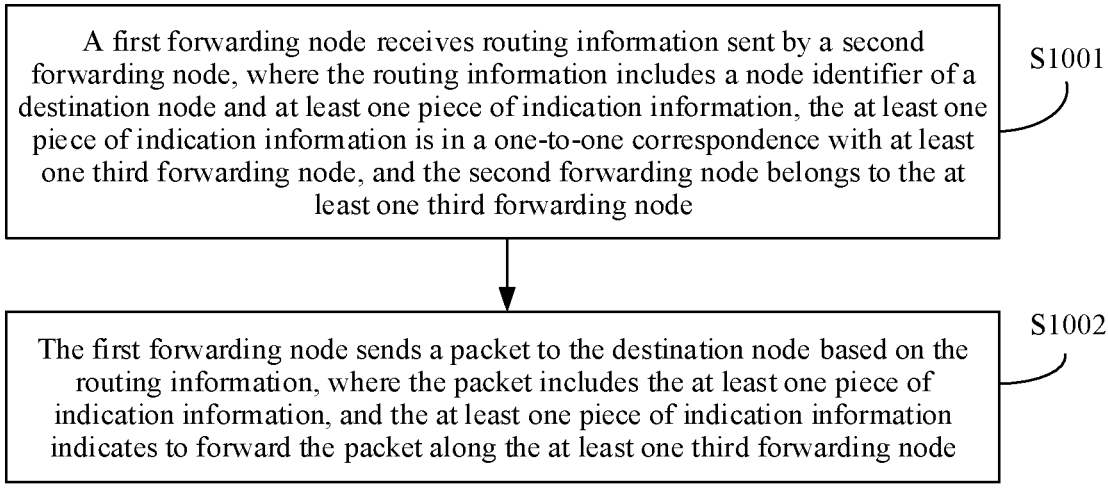
FIG. 10 is a flowchart of a route determining method for a first forwarding node according to an embodiment of this application.

Based on the operation performed by the PE1 in the embodiment shown in FIG. 2A to FIG. 2C or FIG. 5A and FIG. 5B, it can be learned that an embodiment of this application provides a route determining method for a first forwarding node. The first forwarding node may be the PE1 in the embodiment shown in FIG. 2A to FIG. 2C or FIG. 5A and FIG. 5B. For example, as shown in FIG. 10, the method may include the following steps.

S1001: A first forwarding node receives routing information sent by a second forwarding node, where the routing information includes a node identifier of a destination node and at least one piece of indication information, the at least one piece of indication information is in a one-to-one correspondence with at least one third forwarding node, and the second forwarding node belongs to the at least one third forwarding node.

The routing information may be the fourth routing information in the embodiment shown in FIG. 2A to FIG. 2C or FIG. 5A and FIG. 5B, and the destination node may be the CE2, the user host or the router connected to the CE2, the loopback address of the PE2, or the like. This is not uniquely limited herein. In the embodiment shown in FIG. 2A to FIG. 2C, the at least one piece of indication information may include the indication information of the PE2, the indication information of the GW2, and the indication information of the GW1. In the embodiment shown in FIG. 5A and FIG. 5B, the at least one piece of indication information may include the indication information of the GW1.

S1002: The first forwarding node sends a packet to the destination node based on the routing information, where the packet includes the at least one piece of indication information, and the at least one piece of indication information indicates to forward the packet along the at least one third forwarding node.

The packet may be the second packet in the embodiment shown in FIG. 2A to FIG. 2C or FIG. 5A and FIG. 5B. In the embodiment shown in FIG. 2A to FIG. 2C, the at least one piece of indication information may include the indication information of the PE2, the indication information of the GW2, and the indication information of the GW1. In the embodiment shown in FIG. 5A and FIG. 5B, the at least one piece of indication information may include the indication information of the GW1.

Optionally, in S1002, the first forwarding node may establish a correspondence between the node identifier of the destination node and first tunnel information based on the routing information, where the first tunnel information includes the at least one piece of indication information in the routing information. The first forwarding node may then send the packet to the destination node based on the first tunnel information.

Optionally, when the first forwarding node sends the packet to the destination node based on the first tunnel information, the first forwarding node may obtain, based on the node identifier of the destination node, a plurality of pieces of tunnel information corresponding to the node identifier of the destination node. The plurality of pieces of tunnel information correspond to a plurality of tunnels, the plurality of pieces of tunnel information include the first tunnel information. Then, the first forwarding node may determine the first tunnel information from the plurality of pieces of tunnel information based on a tunnel constraint, and send the packet to the destination node based on the determined first tunnel information.

Optionally, the at least one piece of indication information includes an SID of the at least one third forwarding node, and the SID of the at least one third forwarding node is sequentially arranged based on a routing distance between the at least one third forwarding node and the first forwarding node. Alternatively, in another case, the at least one piece of indication information may not be an SID, but another type of indication information determined with reference to a network application scenario, provided that the indication information may indicate (or identify) a corresponding forwarding node. In the embodiment shown in FIG. 2A to FIG. 2C, the at least one third forwarding node may include the PE2, the GW2, and the GW1. In the embodiment shown in FIG. 5A and FIG. 5B, the at least one third forwarding node may include the GW1.

Optionally, the at least one piece of indication information further includes endpoint of the at least one third forwarding node.

Optionally, the at least one third forwarding node includes a fourth forwarding node, and the fourth forwarding node is a node that is in the at least one third forwarding node and that has a largest routing distance from the first forwarding node. For example, the fourth forwarding node in the embodiment shown in FIG. 2A to FIG. 2C is the PE2, and the fourth forwarding node in the embodiment shown in FIG. 5A and FIG. 5B is the GW1. The routing information received by the first forwarding node in S1001 may further include a next-hop identifier, and the next-hop identifier includes a node identifier of the fourth forwarding node.

Optionally, based on the operation performed by the PE1 in the embodiment shown in FIG. 5A and FIG. 5B, it can be learned that in the route determining method, the at least one piece of indication information in the routing information received by the first forwarding node in S1001 includes first indication information. The first indication information indicates the fourth forwarding node, and a segment identifier type of the first indication information is a binding segment identifier.

Figure 11:
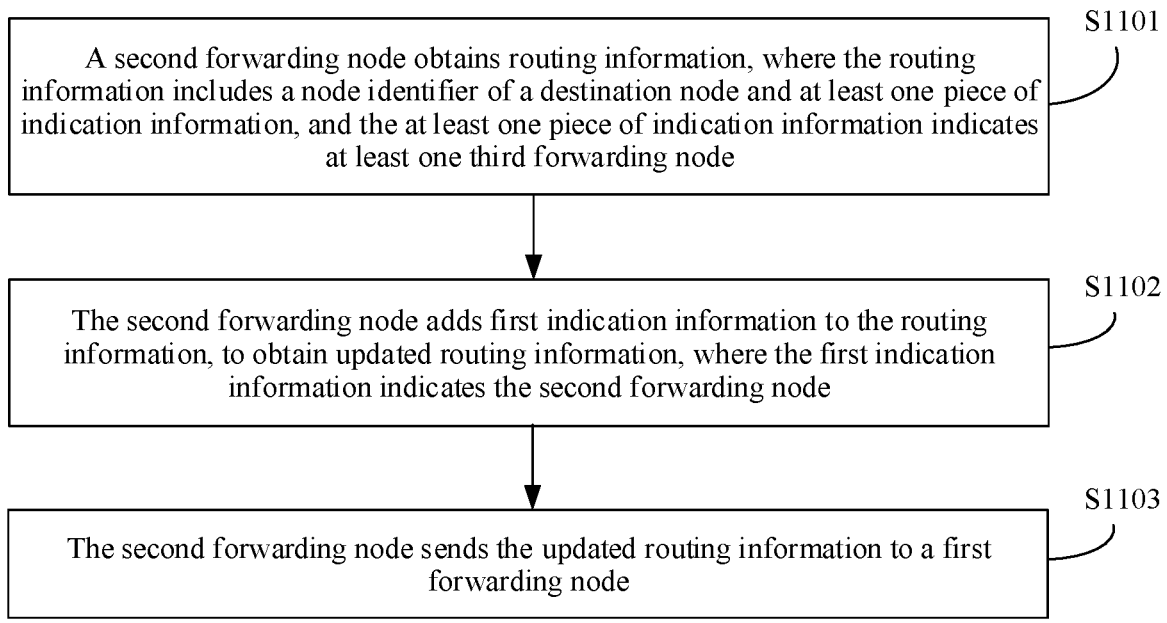
FIG. 11 is a flowchart of a route determining method for a second forwarding node according to an embodiment of this application.

Based on the operation performed by the GW1 or the GW2 in the embodiment shown in FIG. 2A to FIG. 2C, or the operation performed by the GW1 or the GW2 in the embodiment shown in FIG. 5A and FIG. 5B, it can be learned that an embodiment of this application provides a route determining method for a second forwarding node, the second forwarding node may be the GW1 in the embodiment shown in FIG. 2A to FIG. 2C or FIG. 5A and FIG. 5B, or the GW2 in the embodiment shown in FIG. 2A to FIG. 2C or FIG. 5A and FIG. 5B. For example, as shown in FIG. 11, the method may include the following steps.

S1101: A second forwarding node obtains routing information, where the routing information includes a node identifier of a destination node and at least one piece of indication information, and the at least one piece of indication information indicates at least one third forwarding node.

When the second forwarding node is the GW2 in FIG. 2A to FIG. 2C or FIG. 5A and FIG. 5B, the routing information may be the second routing information in the embodiment shown in FIG. 2A to FIG. 2C or FIG. 5A and FIG. 5B, and the destination node is the CE2, the user host or the router connected to the CE2, the loopback address of the PE2, or the like. This is not uniquely limited herein. The at least one piece of indication information in the routing information includes indication information of the PE2, and the at least one third forwarding node indicated by the at least one piece of indication information includes the PE2.

When the second forwarding node is the GW1 in the embodiment shown in FIG. 2A to FIG. 2C or FIG. 5A and FIG. 5B, the routing information may be the third routing information in the embodiment shown in FIG. 2A to FIG. 2C, and the destination node is the CE2, the user host or the router connected to the CE2, the loopback address of the PE2, or the like. This is not uniquely limited herein. The at least one piece of indication information in the routing information includes indication information of the PE2 and indication information of the GW2, and the at least one third forwarding node indicated by the at least one piece of indication information includes the PE2 and the GW2.

Optionally, the at least one piece of indication information includes an SID of the at least one third forwarding node, the SID of the at least one third forwarding node is sequentially arranged based on a routing distance between the at least one third forwarding node and the first forwarding node, and the first forwarding node is the 1$^{st}$ forwarding node that forwards the packet to the destination node.

Optionally, the at least one piece of indication information further includes endpoint of the at least one third forwarding node, or may further include other required information. There is a correspondence between the endpoint information and the other required information and the SID that identifies the forwarding node.

S1102: The second forwarding node adds first indication information to the routing information, to obtain updated routing information, where the first indication information indicates the second forwarding node.

When the second forwarding node is the GW2 in FIG. 2A to FIG. 2C or FIG. 5A and FIG. 5B, the first indication information may be indication information of the GW2, the first indication information indicates the GW2, and the updated routing information may be third routing information.

When the second forwarding node is the GW1 in FIG. 2A to FIG. 2C or FIG. 5A and FIG. 5B, the first indication information may be indication information of the GW1, the first indication information indicates the GW1, and the updated routing information may be fourth routing information.

S1103: The second forwarding node sends the updated routing information to a first forwarding node.

Figure 12:
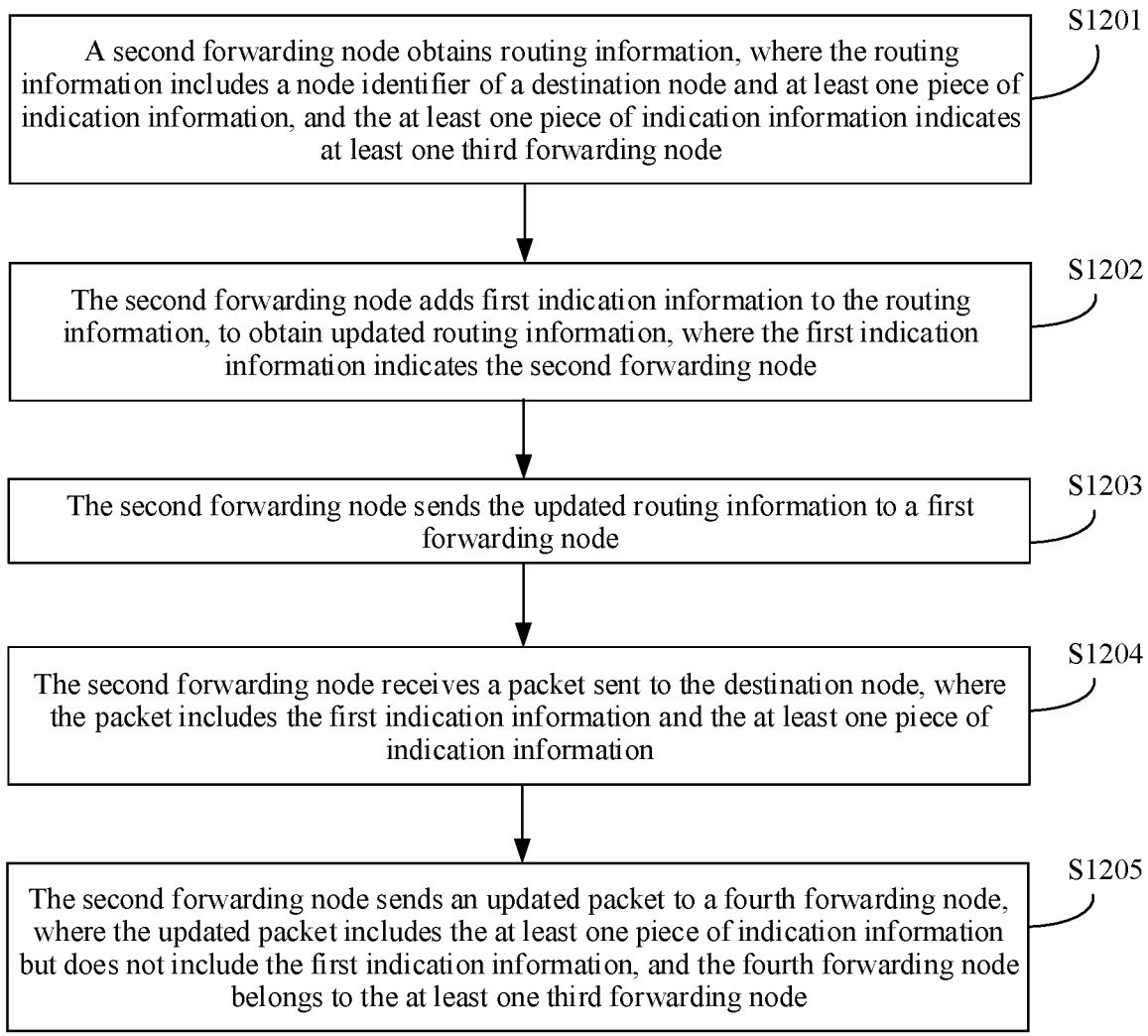
FIG. 12 is a flowchart of another route determining method for a second forwarding node according to an embodiment of this application.

Optionally, based on the operation performed by the GW1 or the GW2 in the embodiment shown in FIG. 2A to FIG. 2C, or the operation performed by the GW2 in the embodiment shown in FIG. 5A and FIG. 5B, it can be learned that an embodiment of this application provides a route determining method for a second forwarding node, the second forwarding node may be the GW2 in the embodiment shown in FIG. 2A to FIG. 2C or FIG. 5A and FIG. 5B, or the GW1 in the embodiment shown in FIG. 2A to FIG. 2C. For example, as shown in FIG. 12, the method may include the following steps.

S1201: A second forwarding node obtains routing information, where the routing information includes a node identifier of a destination node and at least one piece of indication information, and the at least one piece of indication information indicates at least one third forwarding node.

For S1201, refer to S1101. Details are not described in this embodiment of this application again.

S1202: The second forwarding node adds first indication information to the routing information, to obtain updated routing information, where the first indication information indicates the second forwarding node.

For S1202, refer to S1102. Details are not described in this embodiment of this application again.

S1203: The second forwarding node sends the updated routing information to a first forwarding node.

The updated routing information includes the first indication information and the at least one piece of indication information.

When the second forwarding node is the GW2 in FIG. 2A to FIG. 2C or FIG. 5A and FIG. 5B, the first indication information may be the indication information of the GW2, and the at least one piece of indication information includes the indication information of the PE2.

When the second forwarding node is the GW1 in FIG. 2A to FIG. 2C, the first indication information may be the indication information of the GW1, and the at least one piece of indication information includes the indication information of the PE2 and the indication information of the GW2.

S1204: The second forwarding node receives a packet sent to the destination node, where the packet includes the first indication information and the at least one piece of indication information.

When the second forwarding node is the GW2 in FIG. 2A to FIG. 2C or FIG. 5A and FIG. 5B, the packet may be the third packet, the first indication information in the packet is the indication information of the GW2, and the at least one piece of indication information in the packet includes the indication information of the PE2.

When the second forwarding node is the GW1 in FIG. 2A to FIG. 2C, the packet may be the second packet, the first indication information in the packet is the indication information of the GW1, and the at least one piece of indication information in the packet includes the indication information of the PE2 and the indication information of the GW2.

S1205: The second forwarding node sends an updated packet to a fourth forwarding node, where the updated packet includes the at least one piece of indication information but does not include the first indication information, and the fourth forwarding node belongs to the at least one third forwarding node.

When the second forwarding node is the GW2 in FIG. 2A to FIG. 2C or FIG. 5A and FIG. 5B, the updated packet may be the fourth packet, the at least one piece of indication information in the updated packet includes the indication information of the PE2, and the fourth forwarding node is the PE2.

When the second forwarding node is the GW1 in FIG. 2A to FIG. 2C, the updated packet may be the third packet, the at least one piece of indication information in the updated packet includes the indication information of the GW2 and the indication information of the PE2, and the fourth forwarding node is the GW2.

Figure 13:
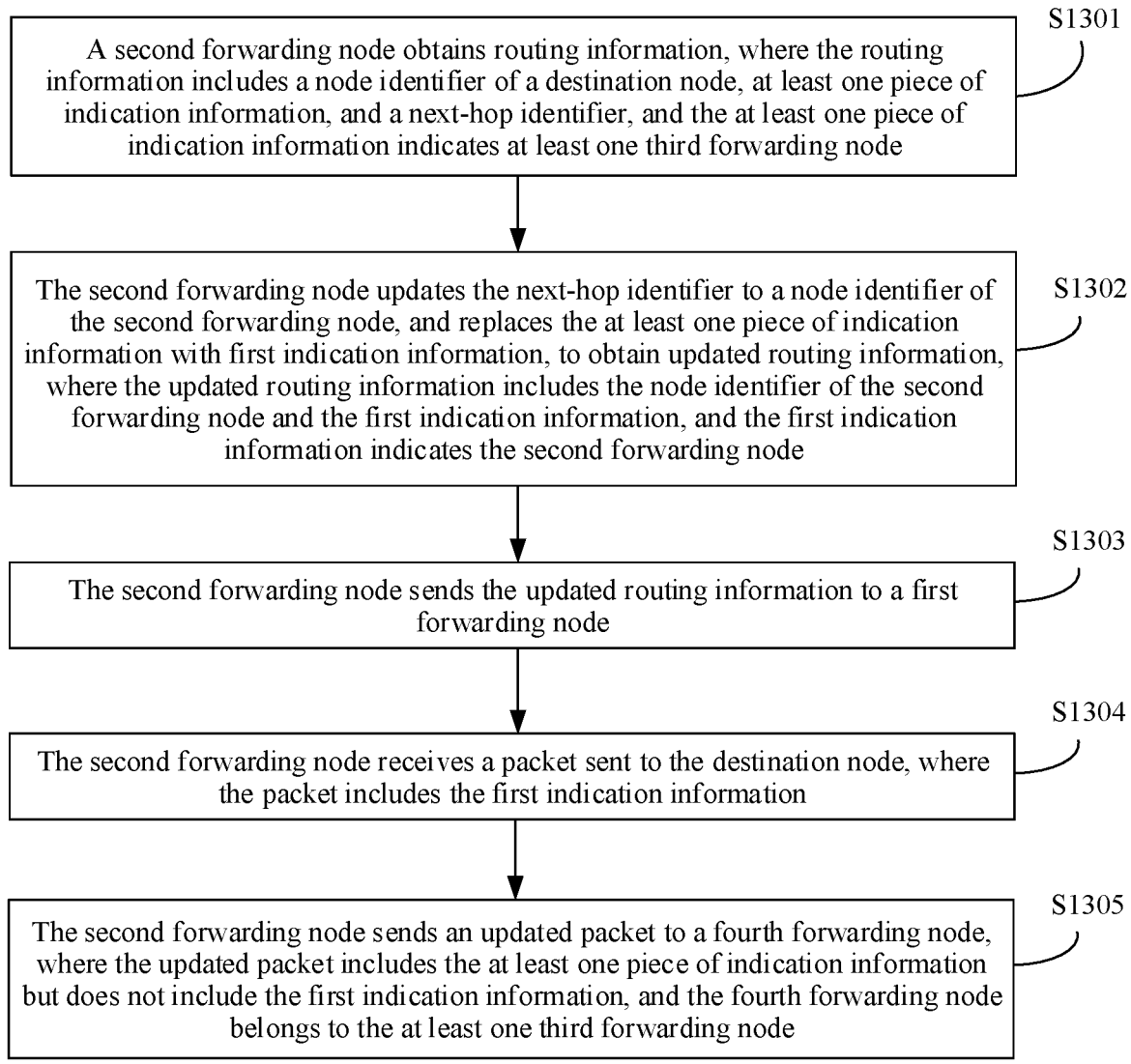
FIG. 13 is a flowchart of another route determining method for a second forwarding node according to an embodiment of this application.

Based on the operation performed by the GW1 in the embodiment shown in FIG. 5A and FIG. 5B, it can be learned that an embodiment of this application provides a route determining method for a second forwarding node. The second forwarding node may be the GW1 in the embodiment shown in FIG. 5A and FIG. 5B. For example, as shown in FIG. 13, the method may include the following steps.

S1301: A second forwarding node obtains routing information, where the routing information includes a node identifier of a destination node, at least one piece of indication information, and a next-hop identifier, and the at least one piece of indication information indicates at least one third forwarding node.

For S1301, refer to S1101. Details are not described in this embodiment of this application again.

The next-hop identifier may be a node identifier of a PE2.

S1302: The second forwarding node updates the next-hop identifier to a node identifier of the second forwarding node, and replaces the at least one piece of indication information with first indication information, to obtain updated routing information, where the updated routing information includes the node identifier of the second forwarding node and the first indication information, and the first indication information indicates the second forwarding node.

For the at least one piece of indication information, refer to the at least one piece of indication information in S1101. For the first indication information, refer to the first indication information in S1102. Optionally, the first indication information includes a binding segment identifier of the second forwarding node. The updated routing information may be the fourth routing information in the embodiment shown in FIG. 5A and FIG. 5B.

S1303: The second forwarding node sends the updated routing information to a first forwarding node.

S1304: The second forwarding node receives a packet sent to the destination node, where the packet includes the first indication information.

The packet may be the second packet in the embodiment shown in FIG. 5A and FIG. 5B, the destination node is the CE2 or the destination node in another case mentioned in the foregoing embodiment, and the first indication information is the indication information of the GW1, for example, the BSID1-GW1.

S1305: The second forwarding node sends an updated packet to a fourth forwarding node, where the updated packet includes the at least one piece of indication information but does not include the first indication information, and the fourth forwarding node belongs to the at least one third forwarding node.

The updated packet may be the third packet in the embodiment shown in FIG. 5A and FIG. 5B. The at least one piece of indication information in the updated packet includes the indication information of the GW2 and the indication information of the PE2, but does not include the indication information of the GW1, the fourth forwarding node is the GW2, and the at least one third forwarding node includes the GW2 and the PE2.

Optionally, in S1305, the second forwarding node may remove the first indication information from the packet, add the at least one piece of indication information to the packet based on a correspondence between the first indication information and the at least one piece of indication information, and then send the updated packet to the fourth forwarding node.

Figure 14:
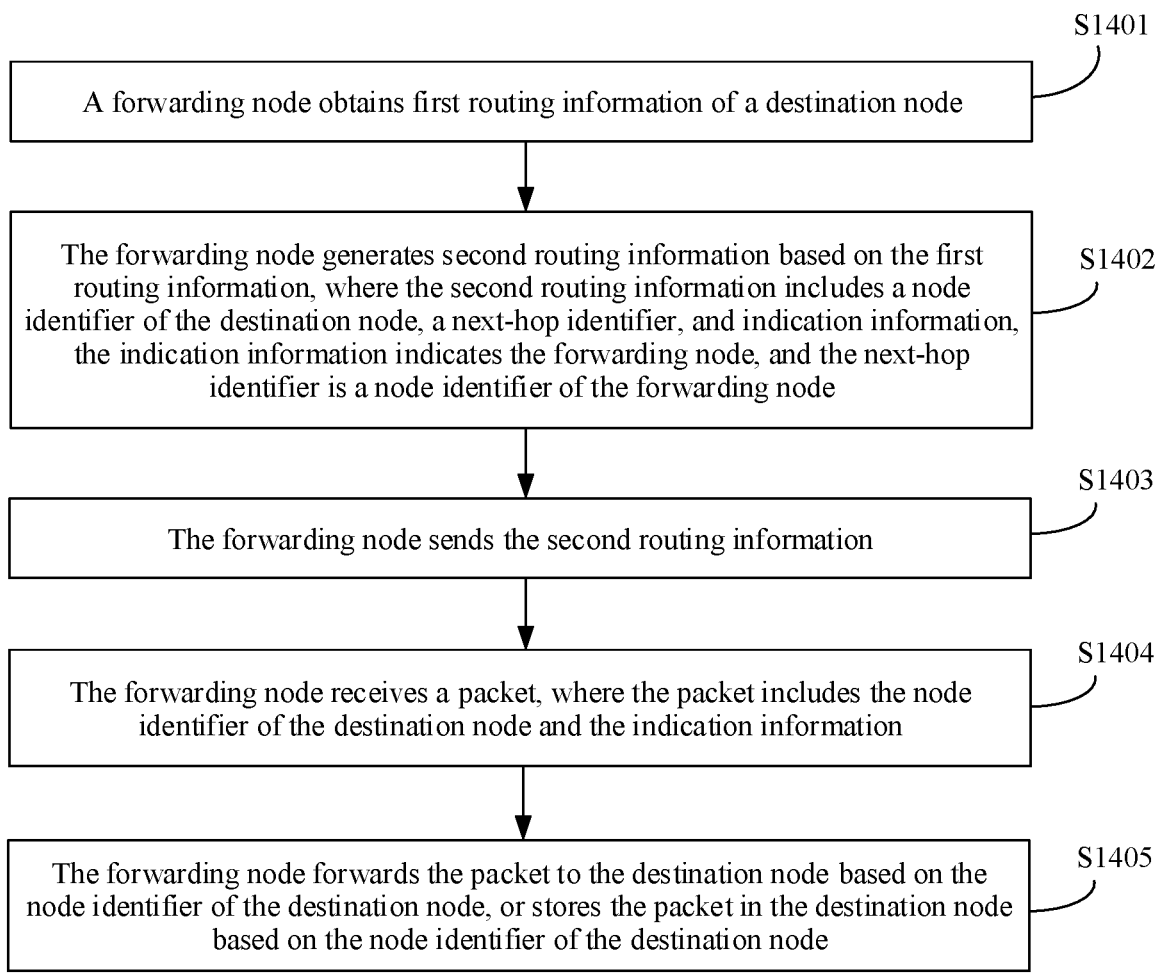
FIG. 14 is a flowchart of another route determining method for a second forwarding node according to an embodiment of this application.

Based on the operation performed by the PE2 in the embodiment shown in FIG. 2A to FIG. 2C or FIG. 5A and FIG. 5B, it can be learned that an embodiment of this application provides a route determining method for a forwarding node. The forwarding node may be the PE2 in the embodiment shown in FIG. 2A to FIG. 2C or FIG. 5A and FIG. 5B. For example, as shown in FIG. 14, the method may include the following steps.

S1401: A forwarding node obtains first routing information of a destination node.

In the embodiment shown in FIG. 2A to FIG. 2C or FIG. 5A and FIG. 5B, the destination node is the CE2 or the destination node in another case mentioned in the foregoing embodiment, and the first routing information is the first routing information in the embodiment shown in FIG. 2A to FIG. 2C or FIG. 5A and FIG. 5B.

S1402: The forwarding node generates second routing information based on the first routing information, where the second routing information includes a node identifier of the destination node, a next-hop identifier, and indication information, the indication information indicates the forwarding node, and the next-hop identifier is a node identifier of the forwarding node.

Optionally, the indication information of the forwarding node includes a segment identifier of the forwarding node.

S1403: The forwarding node sends the second routing information.

In the embodiment shown in FIG. 2A to FIG. 2C or FIG. 5A and FIG. 5B, after generating the second routing information, the forwarding node may send the second routing information to a connected forwarding node (for example, the GW2).

Optionally, the method further includes the following steps.

S1404: The forwarding node receives a packet, where the packet includes the node identifier of the destination node and the indication information.

In the embodiment shown in FIG. 2A to FIG. 2C or FIG. 5A and FIG. 5B, the packet is the fourth packet.

S1405: The forwarding node forwards the packet to the destination node based on the node identifier of the destination node, or stores the packet in the destination node based on the node identifier of the destination node.

In this embodiment of this application, the software-defined wide area network (SD-WAN) scenario shown in FIG. 1 is used as an example. Certainly, an application scenario in this embodiment of this application may not be limited to the SD-WAN scenario.

Figure 15:
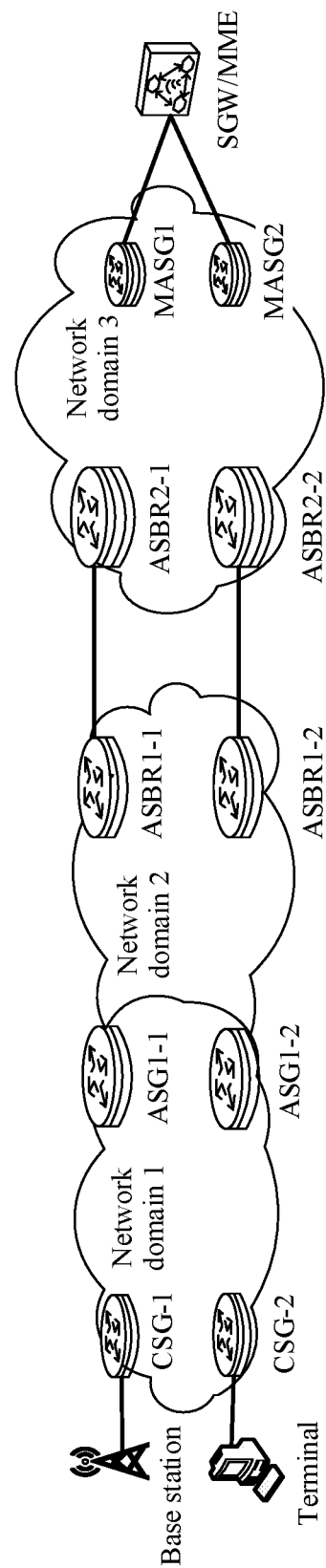
FIG. 15 is a schematic diagram of an application scenario of another route determining method according to an embodiment of this application.
Figure 16:
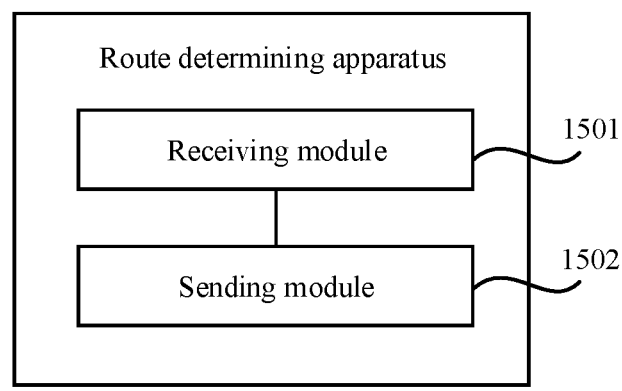
FIG. 16 is a block diagram of a route determining apparatus according to an embodiment of this application.

For example, the application scenario in this embodiment of this application may alternatively be an internet protocol wide area network (IP-RAN) scenario shown in FIG. 15. Refer to FIG. 15. The application scenario includes a terminal, a base station, a plurality of forwarding nodes, and a controller. The controller may be a serving gateway (S-GW) or a mobility management node (MoMME). The plurality of forwarding nodes may include a base station gateway (CSG)-1, a CSG-2, an aggregation site gateway (ASG)1-1, an ASG1-2, an autonomous system boundary router (ASBR) 1-1, an ASBR1-2, an ASBR2-1, an ASBR2-2, a mobile aggregation site gateway (MASG)1, and an MASG2. A network structure shown in FIG. 16 is merely an example. Actually, an application scenario shown in FIG. 16 is also applicable to other types of PE or GW forwarding nodes. For example, the nodes further include a radio service gateway (RSG), a radio network controller side gateway (RSG), a router reflector (RR), and a mobile edge computing (MEC) node.

The network scenario shown in FIG. 16 is still used as an example. The CSG-1, the CSG-2, the ASG1-1, and the ASG1-2 are located in a network domain 1, the ASG1-1, the ASG1-2, the ASBR1-1, and the ASBR1-2 are located in a network domain 2, and the ASBR2-1, the ASBR2-2, the MASG1, and the MASG2 are in a network domain 3. The base station is connected to the CSG-1, the terminal is connected to the CSG-2, the ASBR1-1 is connected to the ASBR2-1, the ASBR1-2 is connected to the ASBR2-2, and both the MASG1 and the MASG2 are connected to the SGW/MME.

In this application scenario, the base station may be a source node, and the SGW/MME may be a destination node. Alternatively, the terminal may be a source node, and the SGW/MME may be a destination node.

In the route determining method provided in embodiments of this application, for an operation of the source node, refer to the operation performed by the CE1 in the embodiment shown in FIG. 2A to FIG. 2C or FIG. 5A and FIG. 5B; for an operation of the destination node, refer to the operation performed by the CE2 in the embodiment shown in FIG. 2A to FIG. 2C or FIG. 5A and FIG. 5B; for an operation of a node (for example, the CSG-1 connected to the base station or the CSG-2 connected to the terminal) connected to the source node, refer to the operation performed by the PE1 in the embodiment shown in FIG. 2A to FIG. 2C or FIG. 5A and FIG. 5B; for an operation of a node (for example, the MASG1 or the MASG2 connected to the SGW/MME) connected to the source node, refer to the operation performed by the PE2 in the embodiment shown in FIG. 2A to FIG. 2C or FIG. 5A and FIG. 5B; and for an operation of any node that is in the plurality of forwarding nodes and that is not connected to the source node or the destination node, refer to the operation performed by the GW1 or the GW2 in the embodiment shown in FIG. 2A to FIG. 2C or FIG. 5A and FIG. 5B.

With reference to FIG. 1 to FIG. 15, the foregoing describes in detail the route determining methods provided in this application. It may be understood that to implement the functions described in the foregoing methods, the forwarding nodes need to include corresponding hardware and/or software modules for performing the functions. This application can be implemented in a form of hardware or a combination of hardware and computer software with reference to the execution steps of the methods described in embodiments disclosed in this specification. Whether a function is performed by hardware or hardware driven by computer software depends on particular applications and design constraints of the technical solutions. A person skilled in the art may use different manners to implement the described functions for each particular application with reference to embodiments, but it should not be considered that the implementation goes beyond the scope of this application.

In embodiments, the corresponding forwarding node may be divided into functional modules based on the foregoing method embodiments. For example, each functional module may be obtained through division based on each corresponding function, or two or more functions may be integrated into one processing module. The integrated module may be implemented in a form of hardware. It should be noted that in embodiments, division into the modules is an example, and is specifically a possible logical function division. During actual implementation, another division manner may be used.

When the division into the functional modules is used, a route determining apparatus provided in this application is described below with reference to FIG. 16 to FIG. 21.

FIG. 16 is a block diagram of a route determining apparatus according to an embodiment of this application. The route determining apparatus may be, for example, the first forwarding node in FIG. 11. As shown in FIG. 16, the route determining apparatus includes an obtaining module 1501 and a sending module 1502.

The obtaining module 1501 is configured to receive routing information sent by a second forwarding node, where the routing information includes a node identifier of a destination node and at least one piece of indication information, the at least one piece of indication information is in a one-to-one correspondence with at least one third forwarding node, and the second forwarding node belongs to the at least one third forwarding node. For an operation performed by the receiving module 1501, refer to S1001 in the embodiment shown in FIG. 10. Details are not described in this embodiment of this application again.

The sending module 1502 is configured to send a packet to the destination node based on the routing information, where the packet includes the at least one piece of indication information, and the at least one piece of indication information indicates to forward the packet along the at least one third forwarding node. For an operation performed by the sending module 1502, refer to S1002 in the embodiment shown in FIG. 10. Details are not described in this embodiment of this application again.

Because the indication information of the forwarding node carries a route including the node identifier of the destination node, after receiving the route, the forwarding node connected to a source node may determine, based on the indication information of the forwarding node in the route, a route and a transmission path for sending a packet to the destination node, to forward the packet to the destination node based on the route and the transmission path. In this process, the indication information of each forwarding node is added by each forwarding node. This avoids that the forwarding node connected to the source node determines the transmission path by transmitting control packets. Therefore, the packets transmitted in a network are reduced, and network load is reduced.

Optionally, the sending module 1502 is configured to: establish a correspondence between the node identifier of the destination node and first tunnel information based on the routing information, where the first tunnel information includes the at least one piece of indication information; and send the packet to the destination node based on the first tunnel information. In another case, the first forwarding node may alternatively not generate the tunnel information based on the routing information, but directly establish a local forwarding entry based on the received routing information. In this way, when the first forwarding node sends the packet to the destination node based on the routing information, the first forwarding node directly sends the packet to the destination node based on the at least one piece of indication information in the routing information.

Optionally, the at least one piece of indication information includes a segment identifier of the at least one third forwarding node, and the segment identifier of the at least one third forwarding node is sequentially arranged based on a routing distance between the at least one third forwarding node and the first forwarding node. For example, SIDs of the forwarding nodes in the routing information may be arranged in descending order or ascending order of routing distances between these forwarding nodes and a PE1. A routing distance between two nodes may be represented by a quantity of nodes through which the packet transmitted between the two nodes needs to pass. A large quantity of nodes through which the packet transmitted between the two nodes needs to pass indicates a large routing distance between the two nodes; or a small quantity of nodes through which the packet transmitted between the two nodes needs to pass indicates a small routing distance between the two nodes.

Optionally, the at least one piece of indication information further includes endpoint information of the at least one third forwarding node. The endpoint of the forwarding node may identify the forwarding node corresponding to the SID, and may be used to quickly determine the forwarding node corresponding to the SID, to facilitate verification, quick positioning, and node maintenance. Therefore, when the indication information of the forwarding node includes the endpoint, the corresponding forwarding node may be quickly determined based on the indication information of the forwarding node, so that maintenance of the forwarding node is facilitated. The endpoint may be information such as a loopback address.

Optionally, the at least one third forwarding node includes a fourth forwarding node, the fourth forwarding node is a node that is in the at least one third forwarding node and that has a largest routing distance from the first forwarding node, the routing information further includes a next-hop identifier, and the next-hop identifier includes a node identifier of the fourth forwarding node. Because the next-hop identifier in the routing information is the node identifier of the fourth forwarding node, when forwarding the packet to the destination node based on the routing information, the first forwarding node may first forward the packet to the fourth forwarding node, so that the fourth forwarding node forwards the packet to the destination node.

Optionally, the sending module 1502 is configured to: obtain, based on the node identifier of the destination node, a plurality of pieces of tunnel information corresponding to the node identifier of the destination node, where the plurality of pieces of tunnel information correspond to a plurality of tunnels, and the plurality of pieces of tunnel information include the first tunnel information; determine the first tunnel information from the plurality of pieces of tunnel information based on a tunnel constraint (for example, a transmission delay condition or a bandwidth condition); and send the packet to the destination node based on the determined first tunnel information.

Optionally, the at least one third forwarding node includes a fourth forwarding node, the fourth forwarding node is a node that is in the at least one third forwarding node and that has a largest routing distance from the first forwarding node, the at least one piece of indication information includes first indication information, the first indication information indicates the fourth forwarding node, and a segment identifier type of the first indication information is a binding segment identifier. When the segment identifier type of the first indication information is the binding segment identifier, it indicates that the fourth forwarding node changes the next-hop identifier in the routing information when forwarding the routing information. Certainly, when the fourth forwarding node changes the next-hop identifier, the segment identifier type of the first indication information may alternatively not be the binding segment identifier. This is not uniquely limited in this application.

When an integrated unit is used, the route determining apparatus that is used for the first forwarding node and that is provided in this application may include a processing module, a storage module, and a communication module. The processing module may be configured to control and manage actions of the route determining apparatus, for example, may be configured to support the route determining apparatus in performing S1001 and S1002. The storage module may be configured to support the route determining apparatus in storing program code, data, and the like. The communication module may be configured to support the route determining apparatus in communicating with another device.

The processing module may be a processor or a controller. The processor may implement or execute various example logical blocks, modules, and circuits described with reference to content disclosed in this application. The processor may alternatively be a combination of processors implementing a computing function, for example, a combination of one or more microprocessors or a combination of digital signal processing (DSP) and a microprocessor. The storage module may be a memory. The communication module may be specifically a device that interacts with another electronic device, such as a radio frequency circuit, a Bluetooth chip, or a Wi-Fi chip.

Figure 17:
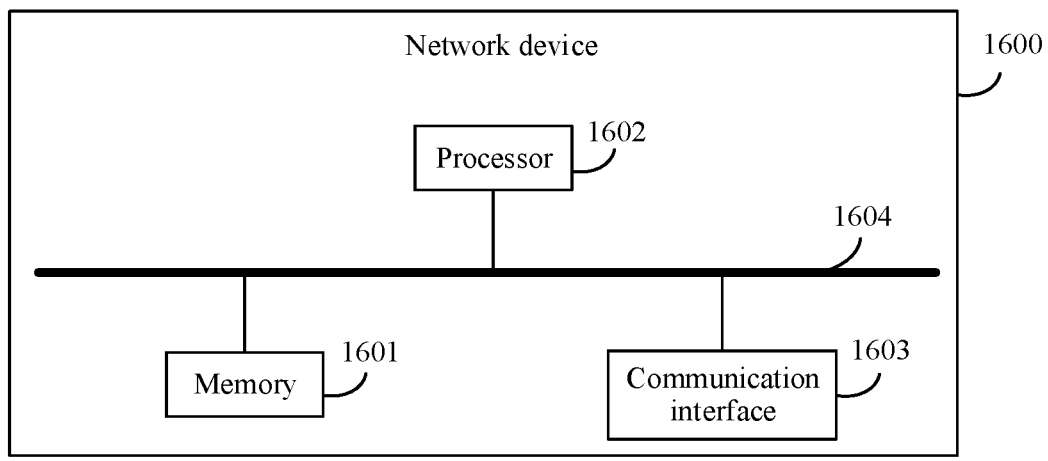
FIG. 17 is a schematic diagram of a structure of a network device according to an embodiment of this application.

In an embodiment, when the processing module is a processor 1602, the storage module is a memory 1601, and the communication module is a communication interface 1603, the route determining apparatus in this embodiment may be a network device 1600 having a structure shown in FIG. 17. Optionally, the network device 1600 may further include a bus 1604. The processor 1602, the memory 1601, and the communication interface 1603 may be connected by using the bus 1604.

Figure 18:
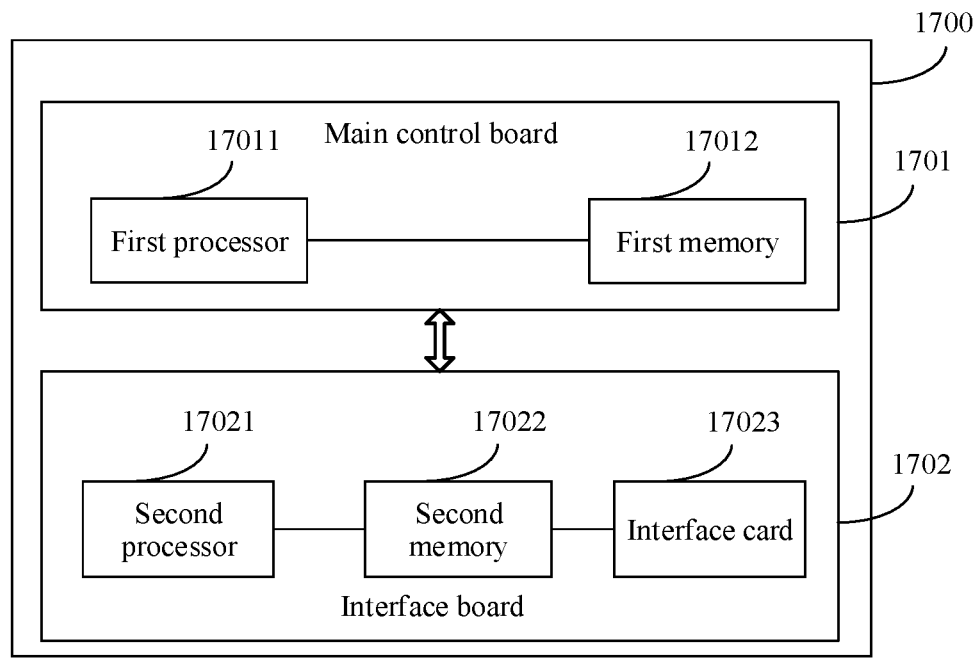
FIG. 18 is a schematic diagram of a structure of another network device according to an embodiment of this application.

In another embodiment, the route determining apparatus in this embodiment may be a network device 1700 having a structure shown in FIG. 18. The network device 1700 includes a main control board 1701 and an interface board 1702. The main control board 1701 includes a first processor 17011 and a first memory 17012. The interface board 1702 includes a second processor 17021, a second memory 17022, and an interface card 17023. The first processor 17011 is configured to invoke program instructions in the first memory 17012 to perform a corresponding processing function, and the second processor 17021 is configured to invoke program instructions in the second memory 17022 to control the interface card 17023 to perform corresponding receiving and sending functions. The processing module in the route determining apparatus includes the first processor 17011 and the second processor 17021 in FIG. 18, the storage module includes the first memory 17011 and the second memory 17022, and the communication module includes the interface card 17023.

Figure 19:
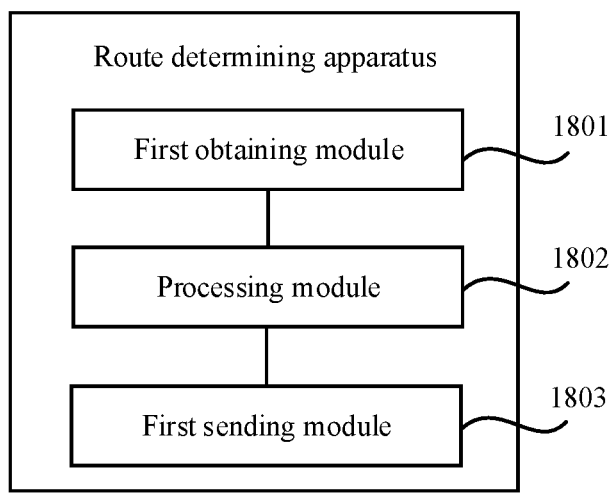
FIG. 19 is a block diagram of another route determining apparatus according to an embodiment of this application.

FIG. 19 is a block diagram of another route determining apparatus according to an embodiment of this application. The route filtering apparatus may be, for example, the second forwarding node in FIG. 11. As shown in FIG. 19, the route determining apparatus includes a first obtaining module 1801, a processing module 1802, and first sending module 1803.

The first obtaining module 1801 is configured to obtain routing information, where the routing information includes a node identifier of a destination node and at least one piece of indication information, and the at least one piece of indication information indicates at least one third forwarding node. For an operation performed by the first obtaining module 1801, refer to S1im in the embodiment shown in FIG. 11. Details are not described in this embodiment of this application again.

The processing module 1802 is configured to add first indication information to the routing information, to obtain updated routing information, where the first indication information indicates a second forwarding node. For an operation performed by the processing module 1802, refer to S1102 in the embodiment shown in FIG. 11. Details are not described in this embodiment of this application again.

The first sending module 1803 is configured to send the updated routing information to a first forwarding node. For an operation performed by the first sending module 1803, refer to S1103 in the embodiment shown in FIG. 11. Details are not described in this embodiment of this application again.

The second forwarding node adds the first indication information to the routing information, and sends the updated routing information. Therefore, after receiving the routing information, the forwarding node connected to a source node may determine, based on the indication information of the forwarding node in the routing information, a route and a transmission path for sending a packet to the destination node, to forward the packet to the destination node based on the route and the transmission path. In this process, each piece of indication information indicating the forwarding node is autonomously added by each corresponding forwarding node. This avoids that the forwarding node connected to the source node determines the transmission path by transmitting a large quantity of control packets. Therefore, the packets transmitted in a network are reduced, and network load is reduced.

Optionally, the routing information obtained by the second forwarding node further includes a next-hop identifier.

The second forwarding node may not change the next-hop identifier in the obtained routing information. In this case, the route filtering apparatus may be, for example, the second forwarding node in FIG. 12. The updated routing information includes the first indication information and the at least one piece of indication information.

Alternatively, the second forwarding node may change the next-hop identifier in the obtained routing information. In this case, the route filtering apparatus may be, for example, the second forwarding node in FIG. 13. The processing module 1802 is configured to: update the next-hop identifier to a node identifier of the second forwarding node; and replace the at least one piece of indication information with the first indication information, to add the first indication information to the routing information, where the updated routing information includes the node identifier of the second forwarding node and the first indication information.

Figure 20:
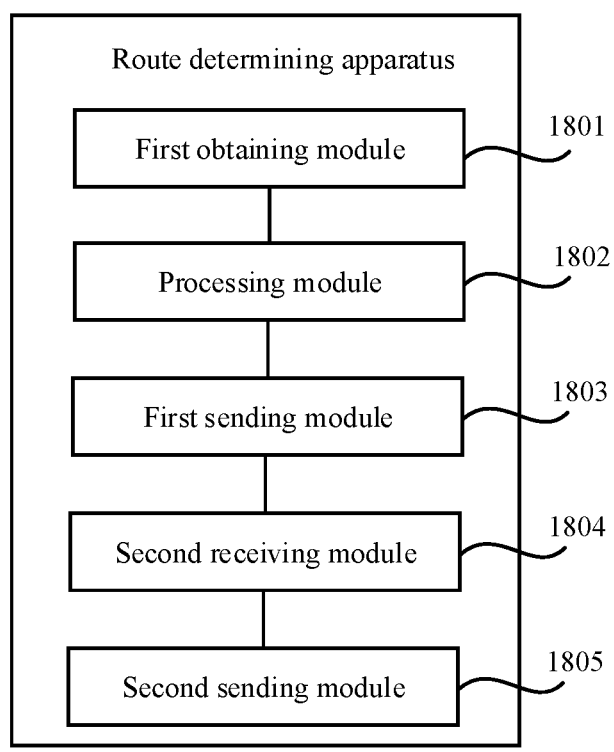
FIG. 20 is a block diagram of another route determining apparatus according to an embodiment of this application.

Optionally, when the second forwarding node does not change the next-hop identifier in the obtained routing information, as shown in FIG. 20, based on FIG. 19, the route determining apparatus further includes a second receiving module 1804 and a second sending module 1805.

The second receiving module 1804 is configured to receive a packet sent to the destination node, where the packet includes the first indication information and the at least one piece of indication information. For an operation performed by the second receiving module 1804, refer to S1204 in the embodiment shown in FIG. 12. Details are not described in this embodiment of this application again.

The second sending module 1805 is configured to send an updated packet to a fourth forwarding node, where the updated packet includes the at least one piece of indication information but does not include the first indication information, and the fourth forwarding node belongs to the at least one third forwarding node. For an operation performed by the second sending module 1805, refer to S1205 in the embodiment shown in FIG. 12. Details are not described in this embodiment of this application again.

It can be learned that when the second forwarding node does not change the next-hop identifier in the obtained routing information, after receiving the packet, the second forwarding node deletes the indication information of the second forwarding node from the packet, to obtain the updated packet.

Figure 21:
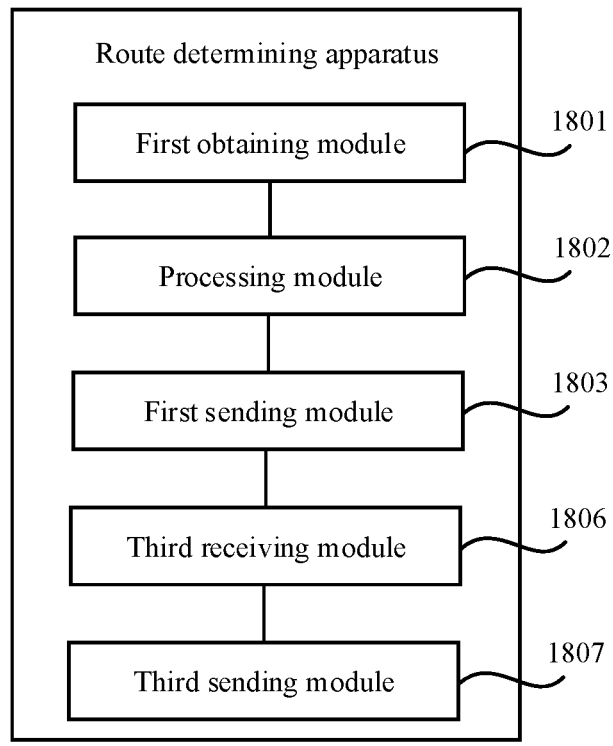
FIG. 21 is a block diagram of another route determining apparatus according to an embodiment of this application.

Optionally, when the second forwarding node changes the next-hop identifier in the obtained routing information, as shown in FIG. 21, based on FIG. 19, the route determining apparatus further includes a third receiving module 1806 and a third sending module 1807.

The third receiving module 1806 is configured to receive a packet sent to the destination node, where the packet includes the first indication information. For an operation performed by the third receiving module 1806, refer to S1304 in the embodiment shown in FIG. 13. Details are not described in this embodiment of this application again.

The third sending module 1807 is configured to send an updated packet to a fourth forwarding node, where the updated packet includes the at least one piece of indication information but does not include the first indication information, and the fourth forwarding node belongs to the at least one third forwarding node. For an operation performed by the third sending module 1807, refer to S1305 in the embodiment shown in FIG. 13. Details are not described in this embodiment of this application again.

It can be learned that when the second forwarding node changes the next-hop identifier in the received routing information, after receiving the packet, the second forwarding node replaces the indication information in the packet.

Optionally, the third sending module 1807 is configured to: remove the first indication information from the packet; add, by the second forwarding node, the at least one piece of indication information to the packet based on a correspondence between the first indication information and the at least one piece of indication information; and send, by the second forwarding node, the updated packet to the fourth forwarding node.

Optionally, the at least one piece of indication information includes a segment identifier of the at least one third forwarding node, the segment identifier of the at least one third forwarding node is sequentially arranged based on a routing distance between the at least one third forwarding node and the first forwarding node, and the first forwarding node is the $1^{st}$ forwarding node that forwards the packet to the destination node. For example, SIDs of the forwarding nodes in the routing information may be arranged in descending order or ascending order of routing distances between these forwarding nodes and a PE1. A routing distance between two nodes may be represented by a quantity of nodes through which the packet transmitted between the two nodes needs to pass. A large quantity of nodes through which the packet transmitted between the two nodes needs to pass indicates a large routing distance between the two nodes; or a small quantity of nodes through which the packet transmitted between the two nodes needs to pass indicates a small routing distance between the two nodes.

Optionally, the at least one piece of indication information further includes endpoint information of the at least one third forwarding node. The endpoint of the forwarding node may identify the forwarding node corresponding to the SID, and may be used to quickly determine the forwarding node corresponding to the SID, to facilitate verification, quick positioning, and node maintenance. The endpoint may be information such as a loopback address.

Optionally, when the second forwarding node changes the next-hop identifier in the obtained routing information, the first indication information includes a binding segment identifier of the second forwarding node. When the second forwarding node changes the next-hop identifier in the received routing information, the first indication information may alternatively not include the binding segment identifier of the second forwarding node. This is not uniquely limited in this application.

When an integrated unit is used, the route determining apparatus that is used for the second forwarding node and that is provided in this application may include a processing module, a storage module, and a communication module. The processing module may be configured to control and manage actions of the route determining apparatus, for example, may be configured to support the route determining apparatus in performing the action in FIG. 11, FIG. 12, or FIG. 13. The storage module may be configured to support the route determining apparatus in storing program code, data, and the like. The communication module may be configured to support the route determining apparatus in communicating with another device.

For the processing module, the storage module, and the communication module, respectively refer to the processing module, the storage module, and the communication module in the foregoing route determining apparatus for the first forwarding node. Details are not described in this embodiment of this application again.

Figure 22:
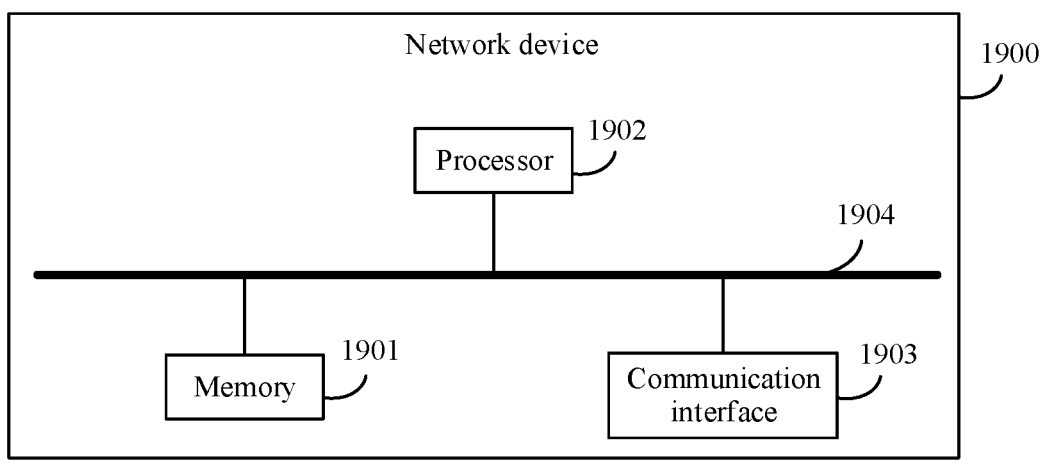
FIG. 22 is a schematic diagram of a structure of another network device according to an embodiment of this application.

In an embodiment, when the processing module is a processor 2002, the storage module is a memory 2001, and the communication module is a communication interface 2003, the route determining apparatus in this embodiment may be a network device 2000 having a structure shown in FIG. 22. Optionally, the network device 2000 may further include a bus 2004. The processor 2002, the memory 2001, and the communication interface 2003 may be connected by using the bus 2004.

Figure 23:
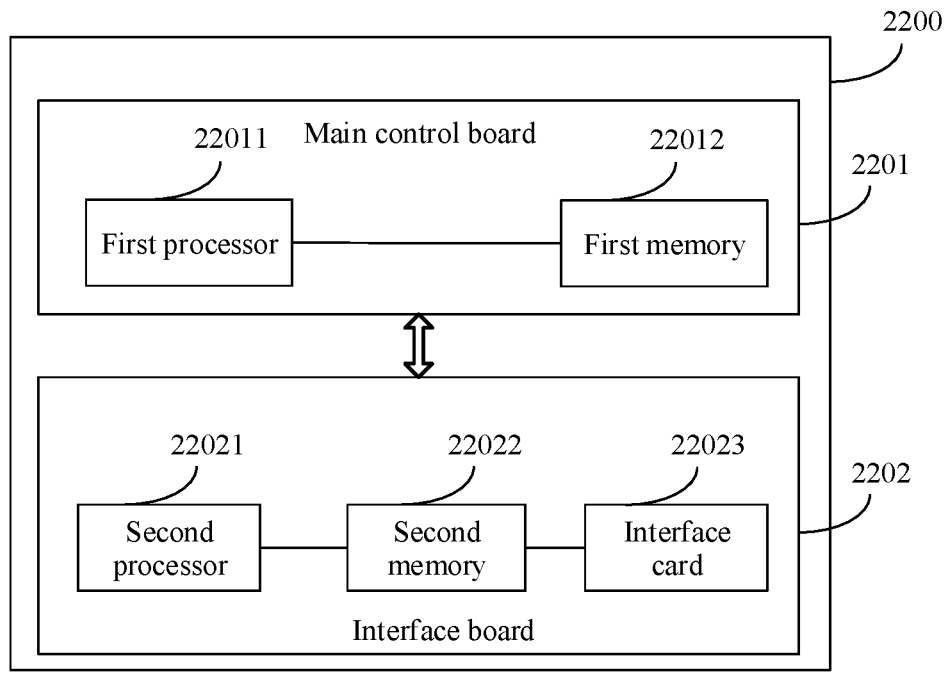
FIG. 23 is a schematic diagram of a structure of still another network device according to an embodiment of this application.

In another embodiment, the route determining apparatus in this embodiment may be a network device 2200 having a structure shown in FIG. 23. The network device 2200 includes a main control board 2201 and an interface board 2202. The main control board 2201 includes a first processor 22011 and a first memory 22012. The interface board 2202 includes a second processor 22021, a second memory 22022, and an interface card 22023. The first processor 22011 is configured to invoke program instructions in the first memory 22012 to perform a corresponding processing function, and the second processor 22021 is configured to invoke program instructions in the second memory 22022 to control the interface card 22023 to perform corresponding receiving and sending functions. The processing module in the route determining apparatus includes the first processor 22011 and the second processor 22021 in FIG. 23, the storage module includes the first memory 22011 and the second memory 22022, and the communication module includes the interface card 22023.

Figure 24:
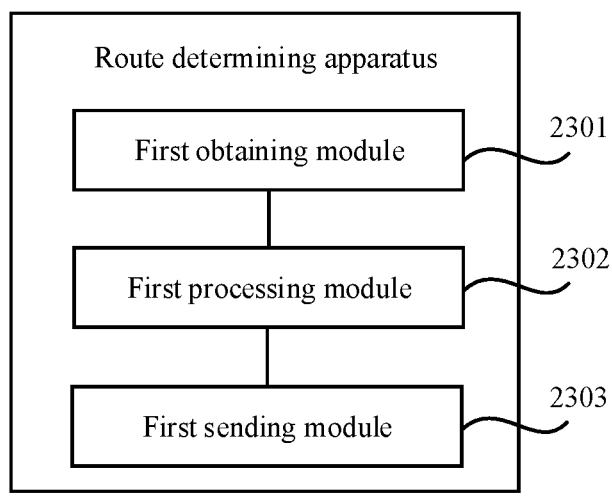
FIG. 24 is a block diagram of another route determining apparatus according to an embodiment of this application.

FIG. 24 is a block diagram of another route determining apparatus according to an embodiment of this application. The route filtering apparatus may be, for example, the forwarding node in FIG. 14. As shown in FIG. 24, the route determining apparatus includes a first obtaining module 2301, a first processing module 2302, and first sending module 2303.

The first obtaining module 2301 is configured to obtain first routing information of a destination node. For an operation performed by the first receiving module 2301, refer to S1401 in the embodiment shown in FIG. 14. Details are not described in this embodiment of this application again.

The first processing module 2302 is configured to generate second routing information based on the first routing information, where the second routing information includes a node identifier of the destination node, a next-hop identifier, and indication information, the indication information indicates a forwarding node, and the next-hop identifier is a node identifier of the forwarding node. For an operation performed by the first processing module 2302, refer to S1402 in the embodiment shown in FIG. 14. Details are not described in this embodiment of this application again.

The first sending module 2303 is configured to send the second routing information. For an operation performed by the first sending module 2303, refer to S1403 in the embodiment shown in FIG. 14. Details are not described in this embodiment of this application again.

The second routing information generated by the forwarding node includes indication information of the forwarding node. Therefore, after receiving the routing information, a forwarding node connected to a source node may determine, based on the indication information of the forwarding node in the routing information, a route and a transmission path for sending a packet to the destination node, to forward the packet to the destination node based on the route and the transmission path. This process avoids that the forwarding node connected to the source node determines the transmission path by receiving control packets. Therefore, the packets transmitted in a network are reduced, and network load is reduced.

Optionally, the indication information of the forwarding node includes a segment identifier of the forwarding node. Optionally, the at least one piece of indication information further includes endpoint information of the at least one third forwarding node. This is not limited in this application.

Figure 25:
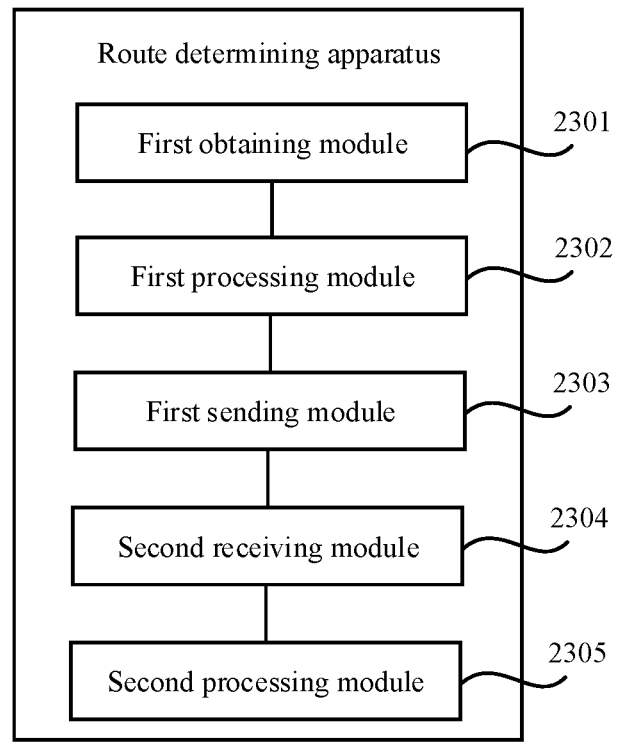
FIG. 25 is a block diagram of another route determining apparatus according to an embodiment of this application.

Optionally, as shown in FIG. 25, based on FIG. 24, the route determining apparatus further includes a second receiving module 2304 and a second processing module 2305.

The second receiving module 2304 is configured to receive a packet, where the packet includes the node identifier of the destination node and the indication information. For an operation performed by the second receiving module 2304, refer to S1404 in the embodiment shown in FIG. 14. Details are not described in this embodiment of this application again.

The second processing module 2305 is configured to: forward the packet to the destination node based on the node identifier of the destination node, or store the packet in the destination node based on the node identifier of the destination node. For an operation performed by the second sending module 2305, refer to S1405 in the embodiment shown in FIG. 14. Details are not described in this embodiment of this application again.

When an integrated unit is used, the route determining apparatus that is used for the forwarding node and that is provided in this application may include a processing module, a storage module, and a communication module. The processing module may be configured to control and manage actions of the route determining apparatus, for example, may be configured to support the route determining apparatus in performing the action in FIG. 14. The storage module may be configured to support the route determining apparatus in storing program code, data, and the like. The communication module may be configured to support the route determining apparatus in communicating with another device.

For the processing module, the storage module, and the communication module, respectively refer to the processing module, the storage module, and the communication module in the foregoing route determining apparatus for the first forwarding node. Details are not described in this embodiment of this application again.

Figure 26:
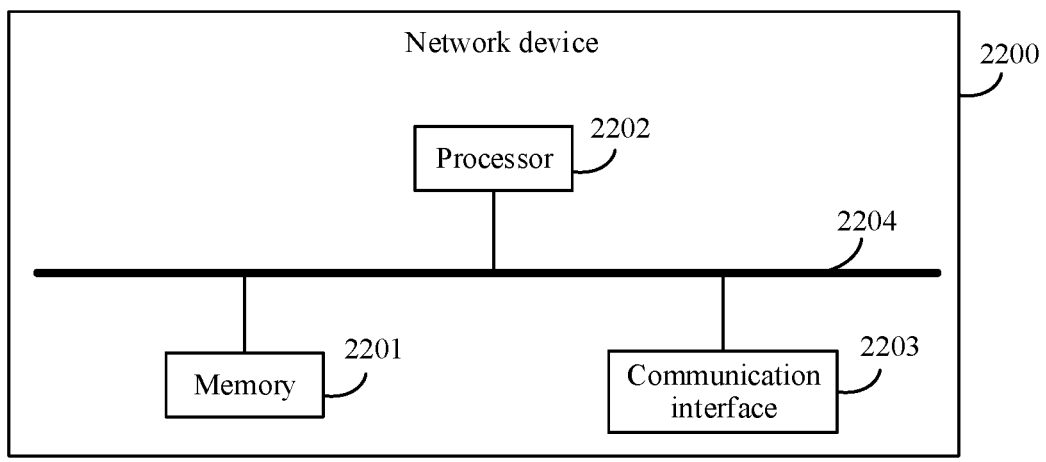
FIG. 26 is a schematic diagram of a structure of still another network device according to an embodiment of this application.

In an embodiment, when the processing module is a processor 2502, the storage module is a memory 2501, and the communication module is a communication interface 2503, the route determining apparatus in this embodiment may be a network device 2500 having a structure shown in FIG. 26. Optionally, the network device 2500 may further include a bus 2504. The processor 2502, the memory 2501, and the communication interface 2503 may be connected by using the bus 2504.

Figure 27:
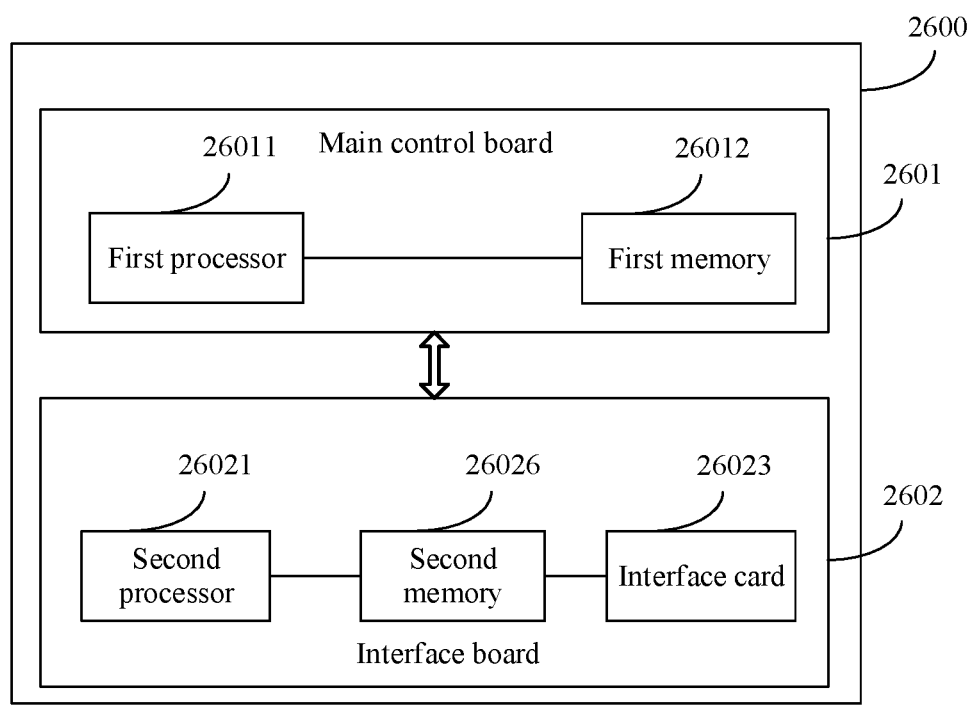
FIG. 27 is a schematic diagram of a structure of still another network device according to an embodiment of this application.

In another embodiment, the route determining apparatus in this embodiment may be a network device 2600 having a structure shown in FIG. 27. The network device 2600 includes a main control board 2601 and an interface board 2602. The main control board 2601 includes a first processor 26011 and a first memory 26012. The interface board 2602 includes a second processor 26021, a second memory 26022, and an interface card 26023. The first processor 26011 is configured to invoke program instructions in the first memory 26012 to perform a corresponding processing function, and the second processor 26021 is configured to invoke program instructions in the second memory 26022 to control the interface card 26023 to perform corresponding receiving and sending functions. The processing module in the route determining apparatus includes the first processor 26011 and the second processor 26021 in FIG. 27, the storage module includes the first memory 26011 and the second memory 26022, and the communication module includes the interface card 26023.

An embodiment of this application provides a computer-readable storage medium. The storage medium stores a computer program, and the computer program is used to perform the method performed by any forwarding node in any route determining method provided in embodiments of this application.

An embodiment of this application provides a computer program product including instructions. When the computer program product runs on a network device, the network device is enabled to perform the method performed by any forwarding node in any route determining method provided in embodiments of this application.

All or some of the foregoing embodiments may be implemented by software, hardware, firmware, or any combination thereof. When the software is used to implement embodiments, all or some of embodiments may be implemented in a form of a computer program product. The computer program product includes one or more computer instructions. When the computer program instructions are loaded and executed on a computer, all or some of the procedures or functions according to embodiments of this application are generated. The computer may be a general-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage apparatus, such as a server or a data center, integrating one or more usable media. The usable medium may be a magnetic medium (for example, a floppy disk, a hard disk, or a magnetic tape), an optical medium, a semiconductor medium (for example, a solid-state drive), or the like.

In this application, the terms "first", "second", and the like are merely intended for description, but cannot be understood as an indication or implication of relative importance. The term "at least one" refers to one or more, and the term "a plurality of" refers to two or more, unless expressly limited otherwise.

For different types of embodiments such as the method embodiments and the apparatus embodiments provided in embodiments of this application, refer to each other. This is not limited in embodiments of this application. A sequence of the operations of the method embodiment provided in embodiments of this application can be properly adjusted, and the operations can be correspondingly added or deleted based on a situation. Any method that can be easily figured out by a person skilled in the art within a technical scope disclosed in this application shall fall within the protection scope of this application. Therefore, details are not described again.

In the corresponding embodiments provided in this application, it should be understood that the disclosed system, device, and apparatus may be implemented in other manners. For example, the apparatus embodiments described above are merely examples. For example, division into the units is merely logical function division, and may be another division manner during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The units described as separate components may or may not be physically separate, and components described as units may or may not be physical units, may be located in one position, or may be distributed on a plurality of network devices (for example, terminal devices). Some or all of the units may be selected based on actual requirements to achieve the objectives of the solutions of embodiments.

The foregoing descriptions are merely specific implementations of this application, but are not intended to limit the protection scope of this application. Any modification or replacement readily figured out by a person skilled in the art within the technical scope disclosed in this application shall fall within the protection scope of this application. Therefore, the protection scope of this application shall be subject to the protection scope of the claims.

What is claimed is:

1. A route determining apparatus, wherein the route determining apparatus comprises:
    at least one processor; and
    a non-transitory computer-readable storage medium storing a program to be executed by the at least one processor, the program including instructions to:
        receive routing information sent by a second forwarding node, wherein the routing information comprises a node identifier of a destination node and at least one piece of indication information, wherein the at least one piece of indication information is in a one-to-one correspondence with at least one third forwarding node, and wherein the second forwarding node is one of the at least one third forwarding node; and
        send a packet to the destination node based on the routing information, wherein the packet comprises the at least one piece of indication information, and wherein the at least one piece of indication information indicates to forward the packet along the at least one third forwarding node, wherein the at least one piece of indication information comprises a segment identifier of the at least one third forwarding node, and wherein the segment identifier of the at least one third forwarding node is sequentially arranged based on a routing distance between the at least one third forwarding node and a first forwarding node.

2. The route determining apparatus according to claim 1, wherein the instructions further include instructions to:

establish a correspondence between the node identifier of the destination node and first tunnel information based on the routing information, wherein the first tunnel information comprises the at least one piece of indication information, wherein the instructions to send the packet to the destination node based on the routing information further comprise instructions to send the packet to the destination node based on the first tunnel information.

3. The route determining apparatus according to claim 1, wherein the first forwarding node is the first forwarding node that forwards the packet to the destination node.

4. The route determining apparatus according to claim 1, wherein the at least one piece of indication information further comprises endpoint information of the at least one third forwarding node.

5. The route determining apparatus according to claim 1, wherein the at least one third forwarding node comprises a fourth forwarding node, wherein the fourth forwarding node is a node that is in the at least one third forwarding node and that has a largest routing distance from the first forwarding node, wherein the routing information further comprises a next-hop identifier, and wherein the next-hop identifier comprises a node identifier of the fourth forwarding node.

6. The route determining apparatus according to claim 2, wherein the instructions further include instructions to:

obtain, based on the node identifier of the destination node, a plurality of pieces of tunnel information corresponding to the node identifier of the destination node, wherein the plurality of pieces of tunnel information correspond to a plurality of tunnels, and the plurality of pieces of tunnel information comprise the first tunnel information; and determine the first tunnel information from the plurality of pieces of tunnel information based on a tunnel constraint, wherein the instructions to send the packet to the destination node based on the first tunnel information further comprise instructions to send the packet to the destination node based on the determined first tunnel information.

7. The route determining apparatus according to claim 1, wherein the at least one third forwarding node comprises a fourth forwarding node, wherein the fourth forwarding node is a node that is in the at least one third forwarding node and that has a largest routing distance from the first forwarding node, wherein the at least one piece of indication information comprises first indication information, wherein the first indication information indicates the fourth forwarding node, and wherein a segment identifier type of the first indication information is a binding segment identifier.

8. A route determining apparatus, wherein the route determining apparatus comprises:

at least one processor; and a non-transitory computer-readable storage medium storing a program to be executed by the at least one processor, the program including instructions to:

obtain routing information, wherein the routing information comprises a node identifier of a destination node and at least one piece of indication information, and wherein the at least one piece of indication information indicates at least one third forwarding node;

obtain updated routing information; and add first indication information to the routing information, wherein the first indication information indicates a second forwarding node; and send the updated routing information to a first forwarding node, wherein the at least one piece of indication information comprises a segment identifier of the at least one third forwarding node, and wherein the segment identifier of the at least one third forwarding node is sequentially arranged based on a routing distance between the at least one third forwarding node and the first forwarding node.

9. The route determining apparatus according to claim 8, wherein the updated routing information comprises the first indication information and the at least one piece of indication information.

10. The route determining apparatus according to claim 8, wherein the routing information further comprises a next-hop identifier, and wherein the instructions further include instructions to:

update the next-hop identifier to a node identifier of the second forwarding node; and replace the at least one piece of indication information with the first indication information, wherein the first indication information is added to the routing information;

wherein the updated routing information comprises the node identifier of the second forwarding node and the first indication information.

11. The route determining apparatus according to claim 8, wherein the instructions further include instructions to:

receive a packet sent to the destination node, wherein the packet comprises the first indication information and the at least one piece of indication information; and send an updated packet to a fourth forwarding node, wherein the updated packet comprises the at least one piece of indication information but does not comprise the first indication information, and wherein the fourth forwarding node is one of the at least one third forwarding node.

12. The route determining apparatus according to claim 8, wherein the instructions further include instructions to:

receive a packet sent to the destination node, wherein the packet comprises the first indication information; and send an updated packet to a fourth forwarding node, wherein the updated packet comprises the at least one piece of indication information but does not comprise the first indication information, and wherein the fourth forwarding node is one of the at least one third forwarding node.

13. The route determining apparatus according to claim 12, wherein the instructions further include instructions to:

remove the first indication information from the packet; and add the at least one piece of indication information to the packet based on a correspondence between the first indication information and the at least one piece of indication information.

14. The route determining apparatus according to claim 12, wherein the first forwarding node is the first forwarding node that forwards the packet to the destination node.

15. The route determining apparatus according to claim 14, wherein the at least one piece of indication information further comprises endpoint information of the at least one third forwarding node.

16. The route determining apparatus according to claim 8, wherein the first indication information comprises a binding segment identifier of the second forwarding node.

17. A route determining apparatus, wherein the route determining apparatus comprises:
at least one processor; and
a non-transitory computer-readable storage medium storing a program to be executed by the at least one processor, the program including instructions to:
obtain first routing information of a destination node;
generate second routing information based on the first routing information, wherein the second routing information comprises a node identifier of the destination node, a next-hop identifier, and indication information, wherein the indication information indicates a forwarding node, and wherein the next-hop identifier is a node identifier of the forwarding node; and
send the second routing information,
wherein the indication information is one of a plurality of pieces of indication information, each of the plurality of pieces of indication information comprises a segment identifier of one of a plurality of additional forwarding nodes, and wherein the segment identifiers are sequentially arranged based on a routing distance between the forwarding node and the plurality of additional forwarding nodes.

18. The route determining apparatus according to claim 17, wherein the indication information of the forwarding node comprises a segment identifier of the forwarding node.

19. The route determining apparatus according to claim 17, wherein the instructions further include instructions to:
receive a packet, wherein the packet comprises the node identifier of the destination node and the indication information; and
forward the packet to the destination node based on the node identifier of the destination node; or
store the packet in the destination node based on the node identifier of the destination node.

* * * * *